US007773967B2

(12) United States Patent
Smith

(10) Patent No.: US 7,773,967 B2
(45) Date of Patent: Aug. 10, 2010

(54) MULTI-MODE—MULTI-BAND DIRECT CONVERSION RECEIVER WITH COMPLEX I AND Q CHANNEL INTERFERENCE MITIGATION PROCESSING FOR CANCELLATION OF INTERMODULATION PRODUCTS

(75) Inventor: Francis J. Smith, 2689 Sackett Dr., Park City, UT (US) 84098

(73) Assignee: Francis J. Smith, Park CIty, UT (US)

( * ) Notice: Subject to any disclaimer, the term of this patent is extended or adjusted under 35 U.S.C. 154(b) by 516 days.

(21) Appl. No.: 11/851,185

(22) Filed: Sep. 6, 2007

(65) Prior Publication Data

US 2009/0068974 A1 Mar. 12, 2009

(51) Int. Cl.
*H04B 1/10* (2006.01)
(52) U.S. Cl. .................. 455/295; 455/296; 455/63.1; 455/114.1
(58) Field of Classification Search .............. 455/295, 455/296, 304, 305, 63.1, 114.1, 114.2
See application file for complete search history.

(56) References Cited

U.S. PATENT DOCUMENTS 4,823,361 A * 4/1989 Yoshida ............... 375/348
5,444,864 A * 8/1995 Smith .................. 455/84
6,311,048 B1 * 10/2001 Loke .................. 455/245.1
6,567,648 B1 * 5/2003 Ahn et al. ............ 455/83
7,672,643 B2 * 3/2010 Loh ................... 455/63.1

* cited by examiner

*Primary Examiner*—Duc M Nguyen
(74) *Attorney, Agent, or Firm*—Blakely, Sokoloff, Taylor & Zafman LLP

(57) ABSTRACT

A Multi-mode-multi-band direct conversion receiver with complex I and Q channel interference mitigation processing for cancellation of intermodulation products (IMPs) are described. In one embodiment, a method comprising over sampling of the entire receiver passband to acquire the IMP source signals that can generate IMPs within the signal of interest (SOI), generate a coherent complex I-Q channel estimates of the interference, generating estimates of 2nd and 3rd order IMP products, sampling of the transmitter feed thru signal and blocking signals and computing the cross modulation products estimate, using the cross modulation cancellation to cancel of the effects of the on chip transmitter feed thru to support building a single transceiver chip with full duplex operation, and creation of an estimate of the DC offset in the receiver in a closed loop fashion to cancel the DC offset in the I and Q channels independently and simultaneously, and adjusting the rate of update to match system parameters.

40 Claims, 17 Drawing Sheets

Figure 6 MatLAB Top Level System Simulation Block Diagram

Figure 7 MatLAB System Simulation Two Tone Test CDMA 2000

Figure 8 MatLAB System Simulation Two Tone Test CDMA 2000 with AMPS Signals Generating Intermodulation Products

MULTI-MODE—MULTI-BAND DIRECT CONVERSION RECEIVER WITH COMPLEX I AND Q CHANNEL INTERFERENCE MITIGATION PROCESSING FOR CANCELLATION OF INTERMODULATION PRODUCTS

FIELD OF THE INVENTION

The field of this invention relates to the field of wired and wireless receivers and the cancellation of interference produced by intermodulation products. It relates to multi-band and multi-mode receivers and the interference mitigation for single and dual conversion radio receivers.

BACKGROUND OF THE INVENTION

Definitions and Terms a.) Signal of Interest (SOI)—this is the target signal which the receiver is processing. It will be a subset of the entire receive band of the receiver.

b.) IMP Source Signals or Source Signals—these are signals in the receive band that are out of band of the SOI, but that can mix in the non-linearities of the receiver and produce intermodulation products that can fall in band of the SOI. Some times also called blocking signals.

c.) IM, IMP, IMD—Intermodulation products which are produced by the IMP source signals d.) IMP Estimate—this is the estimate of the IMP that is developed by the receiver and then used to cancel the inband IMP(s)

e.) $2^{nd}$ Order Products: Intermodulation products produced by the nonlinear mixing of two signals or one signal with itself which produce new signals a frequencies that are the sum and difference of the mixing signals.

f.) $3^{rd}$ Order Products: Intermodulation products produced by the mixing of three signals two or three (one of which may be the same signal multiplied twice) which produce new signals as the sum and differences of the mixing signals g.) IIP2: Input intercept point for $2^{nd}$ order products h.) IIP3: Input intercept point for $3^{rd}$ order products i.) Direct Conversion: Single frequency conversion from RF to baseband or zero IF with out using a non-zero IF j.) IF: Intermediate Frequency k.) RF: Radio Frequency, the frequency at which the signal is received at the antenna l.) Multi-Band: Multiple RF frequency band such as the Cellular Band and the PCS Band in North American Mobile Telephony m.) Multi-Mode: Different modulations, standards and bandwidths, such as CDMA, GSM, GPRS, EDGE, WCDMA, AMPS etc.

n.) DC Offset: Unwanted signals in the SOI at or near DC. These can include LO Feed thru $2^{nd}$ order products, DC offset induced by the analog components, self mixing of high power blocking signals in the receiver passband o.) SAW Filter: Surface Acoustical Wave Filter: Frequency dependent band pass filters with high out of band rejection: These are used at RF and IF to perform channel selection and reject out of band interference and noise.

p.) SNR: Signal to Noise Ratio q.) DFT: Discrete Fourier Transform r.) FFT: Fast Fourier Transform s.) OSR: Over Sampling Ratio: Determines the effective number of bits that can be achieved with narrowband filtering and decimation t.) Dual Conversion Radio: A Radio where in the RF signal is down converter to an IF where channel selection and filtering are done prior to the final down conversion to zero IF or baseband u.) Super-Heterodyne: See dual conversion radio (t). Some times called super-het v.) I and Q Channels: When a signal is decomposed into two orthogonal signals, one is the I (in-phase) channel and one is the Q (quadrature) channel.

w.) LNA: Low Noise Amplifier

BACKGROUND

Direct conversion receivers are highly desirable in mobile applications for several reasons. There are also benefits in fixed applications. The direct conversion receivers have fewer parts, consume less power, take up less space and cost less than super-hetero-dyne receivers. Direct conversion, while it does have desirable attributes, does have implementation challenges. These include managing a large dynamic range while holding linearity and minimizing the impact of close in interfering (blocking signals) and intermodulation products (IMPs) produced by unwanted higher power signals within the receiver pass band. These are typically the $2^{nd}$ and $3^{rd}$ order products caused by the nonlinear property of the receiver chain described by the $2^{nd}$ and $3^{rd}$ order input intercept point (IIP2 and IIP3).

Direct conversion receivers also have the problem of Direct Current (DC) offset which can be caused by self-mixing of the Local Oscillator (LO) caused by LO feed thru, which is at the carrier frequency, producing a DC term in the down converted signal.

In some applications like GSM which are half duplex, the SAW filter is placed prior the Low Noise Amplifier (LNA) (to reject signal outside the receive band). High power blocking signals in the receive band can self mix in the LNA and produce a "DC offset with energy as high as several hundred kHz" if the blocking signal exhibits significant amplitude modulation such as in EDGE which is 8 PSK (up to 10 dB peak to average power).

The invention described herein is a direct conversion receiver with two modes. The first is the classical direct conversion receiver and the second is "effectively" direct conversion receivers in that there is only one analog down conversion and the intermediate frequency (IF) signal is sampled digitally and all subsequent filtering and down conversion is done digitally. In both the direct conversion and the low IF embodiments, the IF SAW filter has been eliminated and there is only one mixer and one LO. The techniques included in this patent mitigate the negative impact of classical direct conversion and mitigate the impact of the IIP2 and the IIP3 while operating over a very large dynamic range.

This invention also includes an "add-on" embodiment of the invention where in existing radio receivers are provided the benefit of the cancellation of $2^{nd}$ and $3^{rd}$ order IMPs.

Examples of applications are described herein, but are not meant to be limiting cases, but to provide a concrete example for description of the invention. These examples are subset of full set of possible and intended uses of the technology. As someone versed in the art will see, this technology is applicable to a wide range of wired and wireless applications.

Applications of this technology include, but are not limited to:

a.) Wireless telephony, AMPS, TDMA, TDMA-IS-136, GSM, GPRS, EDGE, CDMA IS-95/98, CDMA 2000, 1X-EV-DO, 3G & WCDMA, GPS, Direct TV, Terrestrial Conventional TV b.) Wireless Local Area Networks: 802.11a,b,g and Bluetooth c.) Terrestrial Microwave Communications to include LMDS and MMDS d.) Wire-line applications such as cable modems and DSL e.) Satellite telecommunications In the low IF case, the architecture is a slight variation on the classical direct conversion architecture in that the receive band is down converted to a "near zero IF" (a very low IF). Typically, this low IF will be on the order of a few megahertz or less (typically the IF will be on the order of two to three times the baseband bandwidth of the baseband signal). At the "near zero IF", the analog filtering can be done more easily than at zero IF and the 1/f problems are significantly less trouble. The final conversion to base band is done after analog filtering and analog to digital (A/D) conversion, which is done with a $2^{nd}$ or $3^{rd}$ order sigma delta A/D converter which will yield about 84 dB SNR, which provides about 14 bits of resolution.

The signal of interest (SOI) (target signal) is filtered to reject all out of band blocking signals in the analog baseband and digital sigma delta decimating filters. After this filtering, the intermodulation products (IMPS) that fall inband of the SOI are cancelled. This technique will be described for the North American Telephony bands, and other RF bands up to about 2 GHz. The techniques described here in can be applied to many bands and international frequency band allocations. The (SOI) signal of interest filter is programmable or selectable for many different standards, thus supporting multi-mode operation. The SOI filters are digital decimating filters with different bandwidths to support different standards. In one embodiment of this invention, a conventional flash A/D converter replaces the Sigma Delta A/D converter.

The intermodulation mitigation function has a flash A/D converter at RF, IF or zero IF, which over-samples the received passband at 150 to 250 Mega samples per second at 4 to 6 bits, depending on the signal environment being processed. The number of bits may vary in different embodiments of this invention, but as one versed in the arts will recognize, this does not detract from the general application of the invention. The number of bits of quantization and the sampling rates are used to describe a functional embodiment of this invention and are not intend to limit the scope of this invention. In some cases where greater resolution is required, the full passband is sampled at a lower IF to achieve a higher signal to noise ratio (SNR).

The search algorithm finds the out-of-band signals (IMP source signals) that can produce $2^{nd}$ and $3^{rd}$ order intermodulation products that will fall within the band pass of the SOI. The search algorithm is very efficient and very fast. When the source signals are found, the 4 to 6 bit samples are filtered to isolate the signals to a narrow bandwidth. In the North American Telephony Frequency Plan, the widest of these signals will be a WCDMA signal at around 3.8 MHz which will result in a SNR ratio improvement of 20:1 via decimating filters when the signal is narrow band filtered. This yields about 2 more bits of resolution.

The gain in the signal to noise ratio (SNR) is the ratio of the final band pass of the signal to that of the A/D noise band width which is ½ of the sampling rate. In one example, the sampling rate is 200 MS/s, so the noise bandwidth is 100 MHz. The widest signal is 3.8 MHz, so the ratio will always be greater than 25 which will yield an improvement of 14 dB in SNR or about 2 and ½ bits. This will yield copies of the source signals at 6 bits. The maximum effective number of bits is also limited by the SNR of original sampling process and this is a function of the highest frequency in the sampled signal and the jitter on the sampling clock. At high IF or at RF, the effective number of bits is lower than at low IF or zero IF.

The filtered IMP source signals are multiplied together in the time domain to compute an estimate of the SOI in band intermodulation products. This signal is then filtered with a copy of the SOI filter to yield only inter-mods that will fall inband of the SOI. To yield a 6 dB suppression of the intermodulation products (IMP), the cancellation needs only be accurate to 1 bit. 2 bits will yield a 12 dB suppression of the interfering intermodulation products. 3 bits will yield 18 dB and 4 bits will yield 24 dB of IMP suppression. In different embodiments of this invention, the cancellation is done with anywhere from 1 to 6 bits depending on the requirements and the channel characteristics When this architecture is used to demodulate and process bands above approximately 2 GHz (such as 802.11a,b,g), the RF signal can be filtered by an RF surface Acoustical Wave (SAW) filter and the signal down converted to around 2 GHz or lower, where a 4 bit flash A/D converter will sample the signal at a high over sampling ratio. When the signal is narrow band filtered, the gain in SNR will be proportional to the bandwidth reduction relative to the A/D converter sampling noise bandwidth which is ½ of the sampling rate. For 802.11a at 5 GHz, the down conversion is done to a high IF (possibly the same as the RF for the telephony bands) and the Flash A/D converter is used to over sample the receive band. If the over sampling is done at 250 mega samples per second (802.11a receive bands are 100 MHz wide), the A/D noise band width is 125 MHz. When a decimating filter is used to down sample and filter the 802.11a signal to 20 MHz, there is a 6:1 improvement in the SNR or 7.8 dB which will yield a little more than one more additional bit and the samples will now be at 5 bits. When the 802.11b or g, at 2.4 GHz, is down converted to the telephony bands and it is narrowband filtered and down sampled to 22 MHz; the gain is a 7 dB still yielding 5 bits which gives a A/D sampling SNR of 30 dB. The Bluetooth signal to noise ratio improvement (1 MHz) is 20 dB. The Bluetooth and 802.11b/g are both in the ISM band which means that two copies of the 4 bit A/D sampled passband can be sampled with two decimating filters simultaneously to process 802.11b/g and Bluetooth simultaneously at a higher resolution. The over sampling ratio can be increased if desired as may be done in different embodiments of this invention.

The North American PCS telephony frequency plan is shown in FIG. 1. There are two frequency bands used for telephony in North America. This invention is not limited to the North American Telephony applications, but this application will be used to provide a basis for the description of the invention and its application. The frequency planning for North America presents some unique systems engineering problems. The original $1^{st}$ generation AMPS (analog mobile telephone) was deployed in band-0 (824-894 MHz) (cellular band on 30 KHz spacings). TDMA IS-136 was deployed on basically the same frequency plan in both the cellular band and the PCS band (1850 to 1990 MHz on 50 KHz spacings). CDMA IS-95/98 and CDMA 2000 were deployed in both bands on the same original frequency plans, only using multiple AMPS or TDMA channel spacings and using multiple channel allocations. GSM has also been deployed in the PCS band in a similar manner to CDMA.

As one travels across the North American telephony space, any or all of these standards may be encountered with many different overlays. This presents a severe interference environment where different standards use different frequency assignments in the bands and can interfere with each other by creating intermodulation products by mixing with other signals in the band. In both the cellular and PCS bands the mobile units must receive the entire receive band because the channel assignments are not known until the physical cell is entered. These assignments can and do vary significantly as one traverses North America.

GSM and WCDMA must meet performance requirements in the presence of blocking signals that are nearly as high as the CDMA2000 two tone test. It is interesting to note that, if a GSM handset has a system IIP3 of +0 dBm (cascaded IIP3 from the antenna thru baseband filters) (−10 is more common for GSM) and it is subjected to tones at −21 dBm, the IMP will be −63 dBm or more than 40 dB above the GSM sensitivity requirement. 3G WCDMA will be more vulnerable because the band width is 3 times that of CDMA2000, and it may be subjected to multiple IMPs As shown in FIG. 1, the blocking signals can be quite large and can limit the sensitivity and dynamic range of a mobile receiver. CDMA is the most susceptible because it is a stationary (does not frequency hop) wideband signal and thus there is high probability that inter-mods generated in the receive band can fall inband of the signal of interest. This is a smaller issue for AMPS and TDMA since they are only 30 kHz wide, but the CDMA 2000 signal is 1.25 MHz wide. GSM is somewhere in the middle with a bandwidth of 200 kHz, and it may or may not be frequency hopped which may provide some, but not total immunity to IMP problems.

When 3G-WCDMA is deployed in North America, the problem will be 3 to 4 times worse since WCDMA is 3 to 4 times as wide as CDMA2000. WCDMA may have the problem of multiple inter-mods falling inband. This invention provides a method of dealing with this. The following description will start with the Multi Mode dual band Receiver for CDMA, AMPS, TDMA, GSM, EDGE, GPRS and 3G-WCDMA. The architecture modifications/additions to support 802.11a,b,g and Bluetooth are practical. This invention can be implemented in such a manner as to support all of the telephony standards and the Wireless Local Area Network (WLAN) (example 802.11a,b.g) and Personal Area Network (PAN) (example Bluetooth) under software control.

SUMMARY OF THE INVENTION

A method and apparatus for processing signals is described. The invention provides the capability to cancel intermodulation products in receivers without the use of notch filters adaptive or fixed. It provides the capability for removing IMPs without taking out the energy of the signal of interest (SOI). The invention searches for and recovers the signals that are out of band of the SOI that can mix as a function of the non-linearities in the receivers and cause interference from intermodulation products (IMP). The invention uses the source signals and multiplies them together in the time domain to create an IMP cancellation signal for canceling the SOI inband IMPs. DC offset from multiple sources is also cancelled. The interference is cancelled in real time or near real time.

The invention is applicable to both direct conversion and super heterodyne receivers. The invention is primarily focused on Direct Conversion Radio Receivers, or single conversion, for wireless and wire line applications. These are receivers with only one analog frequency conversion stage and interference mitigation technology to mitigate the degradations due to inband and out of band interfering signals. This invention is also directly applicable to dual frequency conversion radios (Super Heterodyne). The invention is applicable to multi-mode and multi-band operations. This invention has an RF analog input and outputs digital I and Q samples (In phase and Quadrature) to a vendor's baseband processor depending on the standard in use. This invention covers the cancellation of intermodulation products produced in the non-linear components in radio and wireline receivers.

This invention includes an architecture for an add-on embodiment where in existing receivers are provided IMP cancellation and DC offset compensation.

DETAILED DESCRIPTION OF THE INVENTION

The detailed description that follows used the PCS band in North America and focuses on CDMA2000 to provide a concrete example for the description of the invention. This is not intended to limit the application of this invention. As one versed in the arts will recognize, this invention is applicable to a wide range of wired and wireless applications and is modulation independent and can be applied to all international bands and radio standards.

In one embodiment of this invention, the receive signal is spit after the LNA and one path is processed in a conventional manner to recover the SOI. The other path is used to find the IMP source signals, to generate an IMP cancellation signal and then to cancel the $2^{nd}$ and $3^{rd}$ order IMP products that fall in band of the signal of interest in real or near real time.

Search Algorithm

Figure 1:
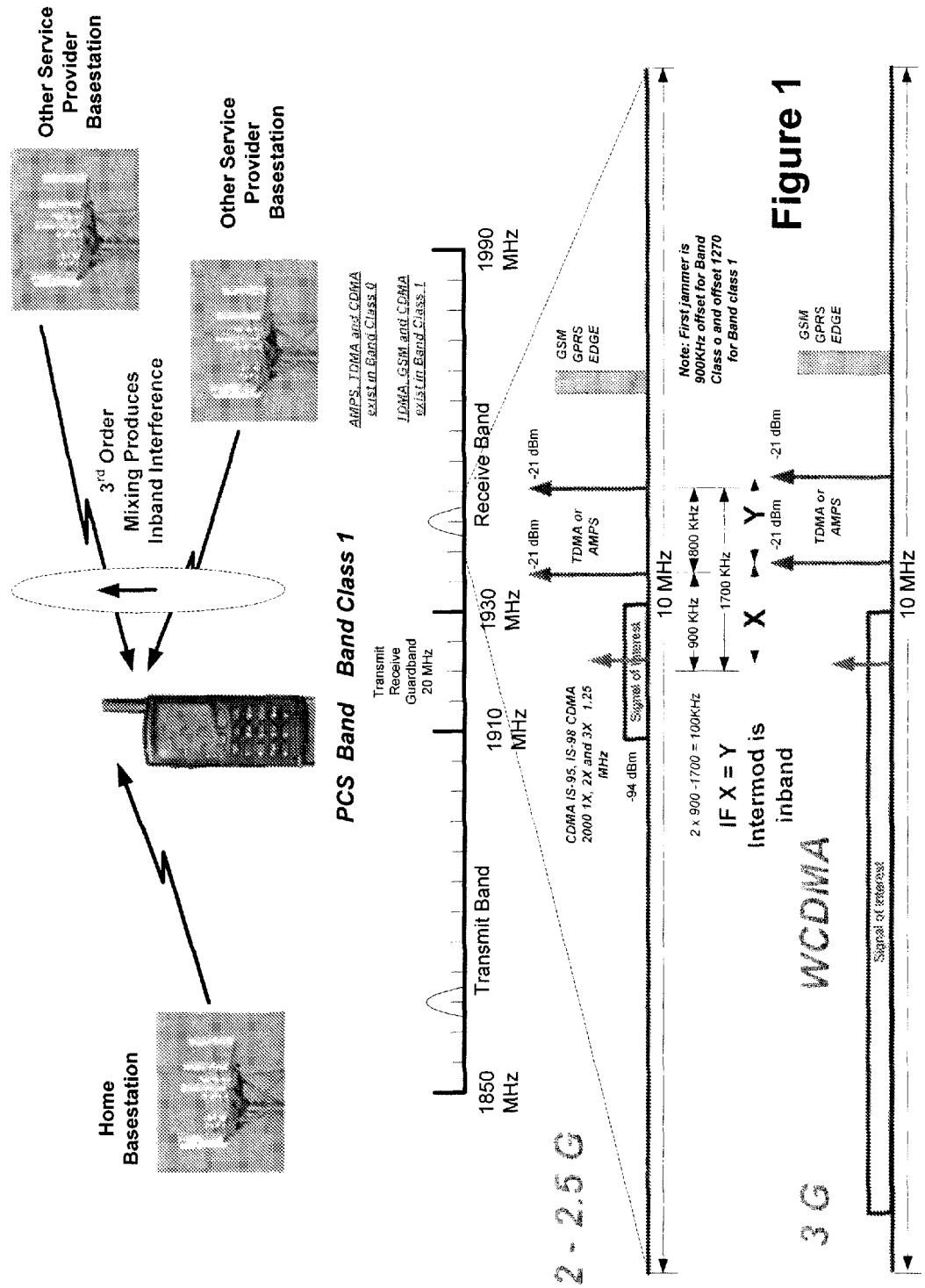
FIG. 1: North American PCS Wireless Telephony Band and $3^{rd}$ Order Intermodulation Products Generation Mechanism.
Figure 2:
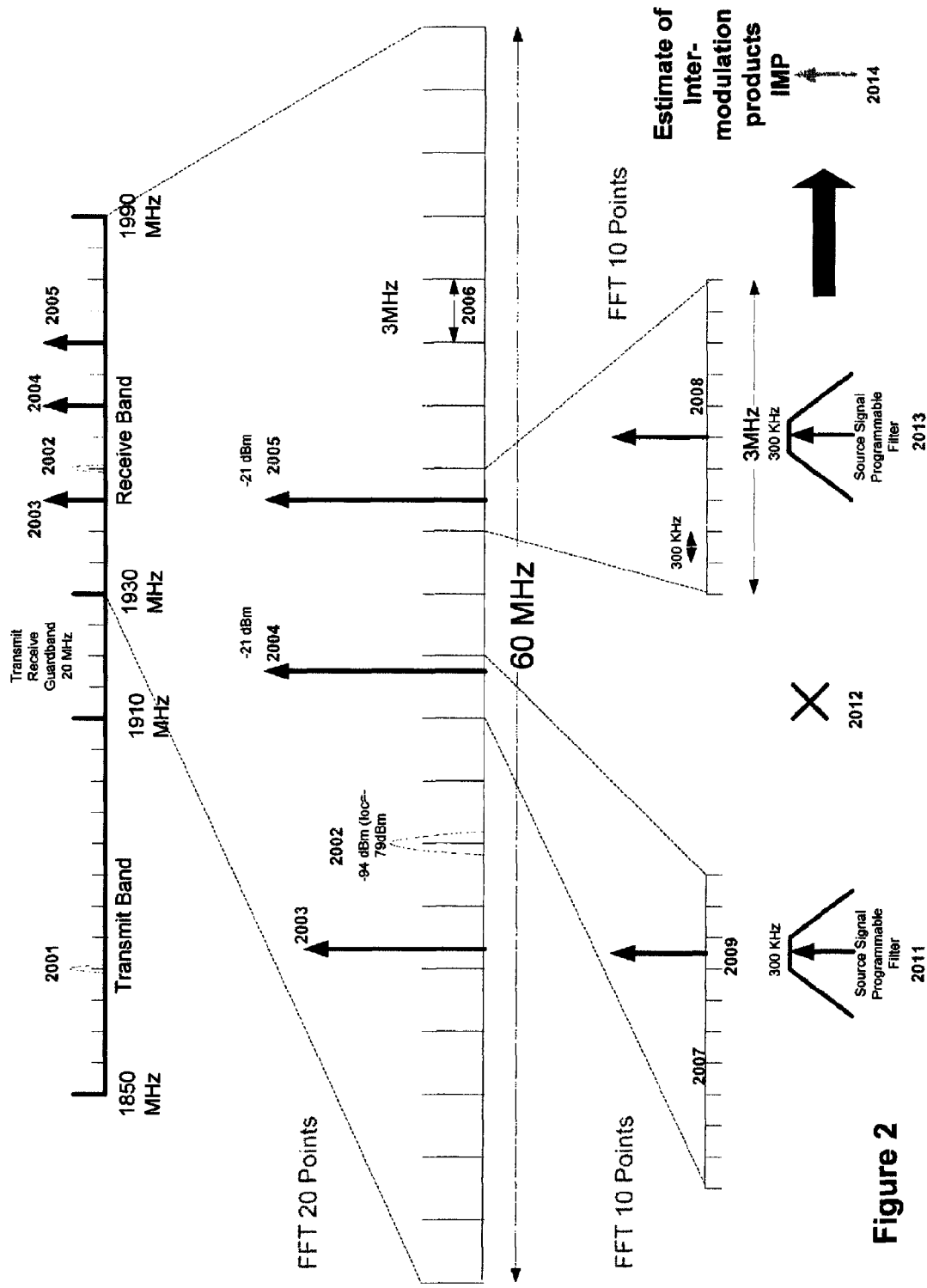
FIG. 2: Search Algorithm and IMP Estimate Generation

In one embodiment of this invention, as shown in FIG. 2, the entire receive band of the wireless standard is received by the RF front end of the receiver. In this case, the receive band is the PCS band of North America from 1930 MHz to 1990 MHz. The transmit and receive signals are frequency pairs and are offset by 80 MHz as shown in 2001 and 2002. In this example, as shown in FIGS. 2, 2003, 2004 and 2005 are high power blocking signals and are potential IMP source signals that can produce inband intermodulation products (IMP).

In one embodiment of this invention, as shown in FIG. 2, the full 60 MHz receive band is sampled at 150 Mega samples per second at a low resolution of 4 to 6 bits flash A/D converter. In another embodiment of this invention, a sigma Delta A/D is used. In another embodiment of this invention, the RF signal is down converted to a lower IF and more bits of quantization are used in the A/D depending on the resolution required. As one versed in the art will recognize, the number of bits of quantization is a design implementation detail and this does not detract from the general application of the invention.

After the full pass band samples have been acquired, a sufficient number of samples are collected to provide the required frequency resolution in the FFT or DFT. If the desired frequency resolution is X MHz, samples must be collected for at least 1/X microseconds.

In one embodiment of this invention, an FFT is computed for the entire receive band and in another embodiment the search is a two step process. In the second embodiment, as shown in FIG. 2, the 60 MHz band is broken up into 3 MHz bands and a 20 point FFT or DFT is computed to find the location of the energy of the blocking signals. As shown in this example, the energy of the blocking signals 2003, 2004 and 2005 is isolated to three 3 MHz bands 2006. The algorithm determines which signals have the potential to produce inband IMPs and thus ignores signal 2003 because there is no signal that it can mix with to product an inband IMP. In the second step, a 10 point FFT is computed for each of the 3 MHz bands identified as having sufficient energy to be of interest. The 10 point FFTs now isolate the IMP source signals to within 300 KHz. The selection of the exact Bandpass of the filters for isolation of the IMP source signals and the resolution of the FFT or DFT is an implementation detail which is dependent on the signal environment and the application and this example is not intended to limit the scope of the invention. As one versed in the art will recognize, the specific band widths and FFT/DFT resolutions may vary by application and this does not detract from the general application of the invention.

The frequency resolution of the FFT or DFT and the Bandpass of the filters for isolating the IMP source signals is an implementation design issue and as one versed in the art will recognize, this selection of these parameters does not detract from the general application of the invention. The selection of these parameters is applications dependent.

In one embodiment of this invention, the real time samples from the flash A/D converter are sent to two programmable decimating filters where the signals 2004 and 2005 are band pass filtered with digital decimating filters and the samples are down sampled. In this example, the down sample is to around 10 mega samples per second, but may vary with application. A lower sample rate is now required because the Bandpass is a small fraction of the full receiver Bandpass.

In one embodiment of this invention, the signals 2004 and 2005 are filtered with benign filters of only a few poles so as to render a high fidelity copy of the signals in the time domain. In a real system, the energy may be spread across the subband and not concentrated in a single frequency as shown in the FIG. 2. The frequency resolution of the FFT or DFT and the Bandpass of the filters for isolating the IMP source signals is an implementation design issue and as one versed in the art will recognize, this selection of these parameters does not detract from the general application of the invention. The selection of these parameters is application dependent.

In one embodiment of this invention, the filtered IMP source signals 2011 and 2013 are multiplied together digital sample by digital sample to create an estimate of the IMP created by the system. By knowing the location of the signals 2011 and 2013, the algorithm can determine which signal is squared and which one is only multiplied once. The product of the multiplication is filtered to only pass those IMP components that fall in band of the SOI. At this point, the IMP estimate 2014 may not have the correct phase and amplitude to cancel the inband IMP produced by the system. This is corrected later.

IMP Cancellation Process

Figure 3:
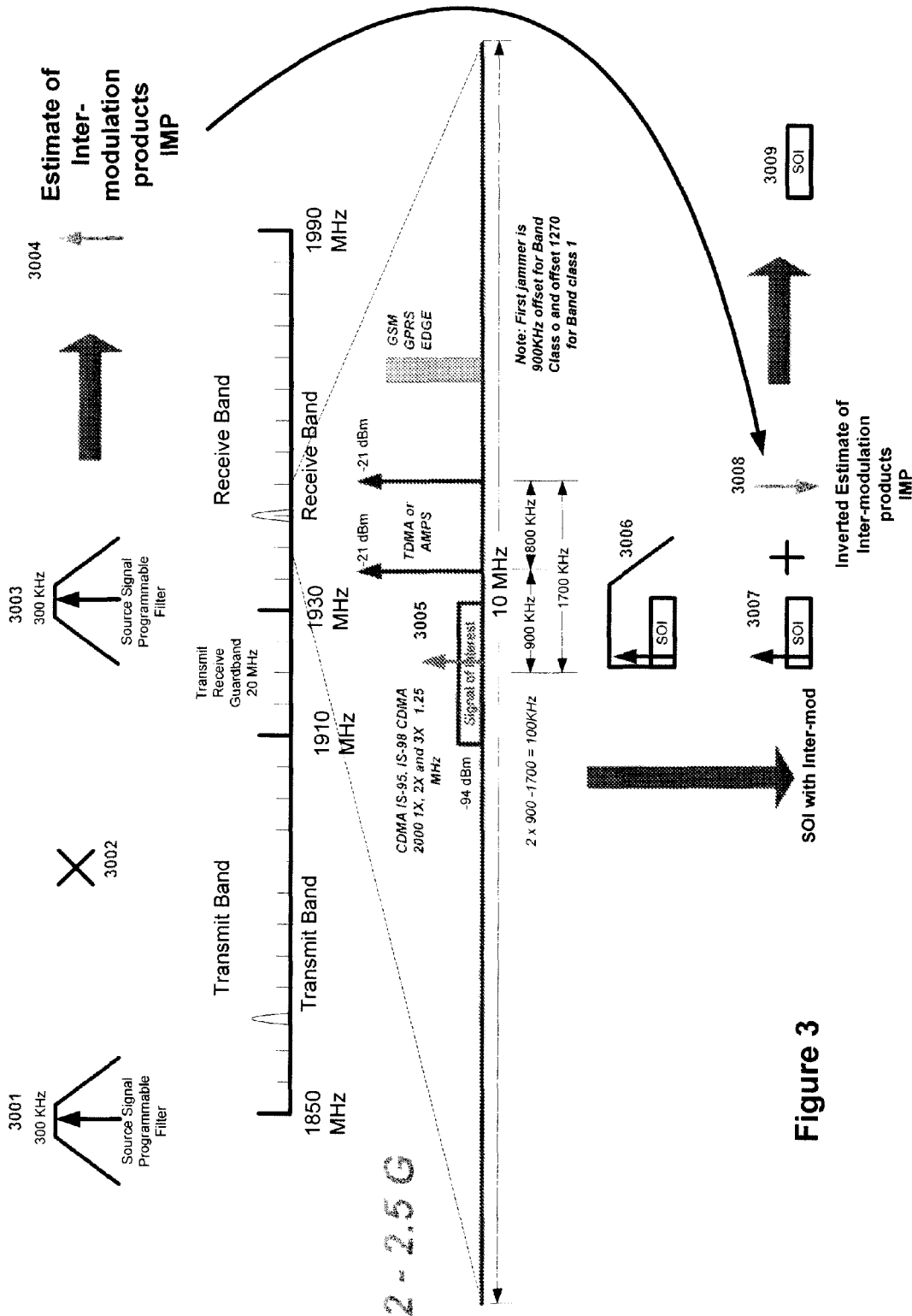
FIG. 3: IMP Cancellation Process

In one embodiment of this invention, as shown in FIG. 3, the IMP source signals 3001 and 3003 that have been isolated in the search process, FIG. 2 signals 2011 and 2113, are multiplied together in the time domain to create an estimate of the IMP produced in the SOI. In a parallel path, the receive signal passband is down converted to zero IF (or a low IF), by means of a tunable LO such that the SOI 3005 is down converted to zero IF 3006. The SOI is filtered first with analog low pass filters and then sampled with a $2^{nd}$ or $3^{rd}$ order sigma delta A/D converter to achieve 14 bits of resolution. The decimating filter in the sigma delta A/D is a high order digital filter which rejects the close in blocking signals.

Figure 4:
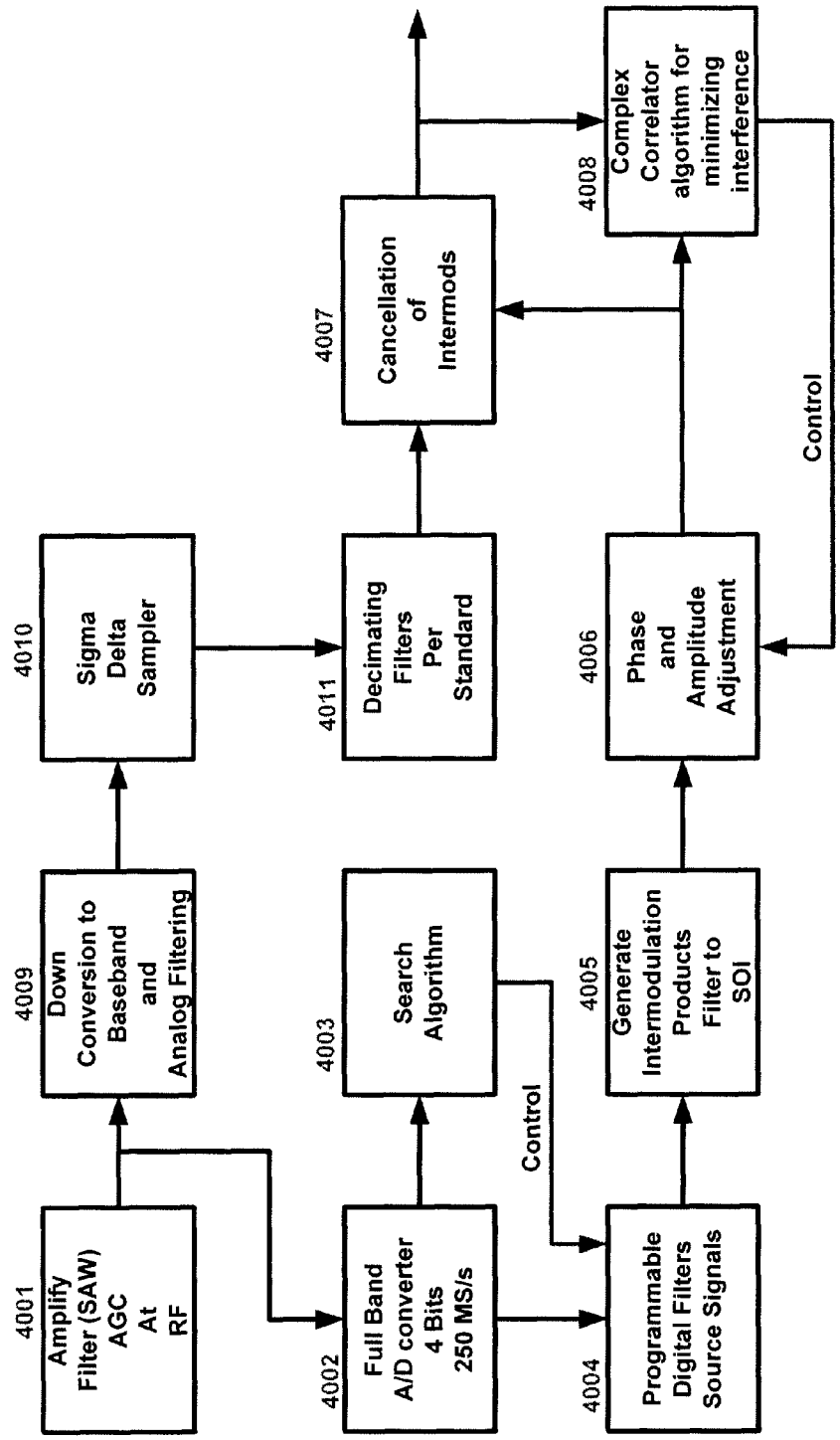
FIG. 4: Top Level Functional Flow for a Direct Conversion Receiver with Intermodulation Interference Mitigation

The SOI 3006 still has the $2^{nd}$ and $3^{rd}$ order IMPs in band 3007. The IMP estimate 3004 is now inverted 3008 and is used to cancel the inband IMP and yield the nearly IMP free SOI 3009. In a near real time (but not real time—thus no stability problems) the output of the cancellation process is correlated with the IMP estimate and the phase and amplitude of the IMP estimate are adjusted to minimize the correlation. The top level functional flow for the direct conversion receiver with interference mitigation that was shown in FIGS. 2 and 3 and the functional flow is shown in FIG. 4 and discussed below.

In one embodiment of this invention, the full receive band is received by the RF front end of the receiver block 4001. This block contains the LNA and buffer amplifiers and an AGC etc. IMPs can be generated in 4001 as well as other down stream blocks. At the output of 4001, the signal is spit and one path goes to the SOI processing path blocks 4009, 4010 and 4011. This path 4001, 4009, 4010 and 4011 will create IMPs as a function of the IIP2 and IIP3 parameters. The parallel path 4002 thru 4008 will create an estimate of the inband IMP produced by 4001, 4009, 4010 and 4011. The phase and amplitude of the estimated IMP will be adjusted to optimize the cancellation process.

In one embodiment of this invention, the signal is split at the output of 4001 and one signal path goes to block 4002. In block 4002, the full passband of the receiver is sampled at a low resolution of around 4 to 6 bits at a sample rate that will not cause aliasing. In different embodiments of this invention, the sampling resolution and the sample rate are varied depending on the application. As one versed in the art will recognize, the selection of the sampling rate and the resolution of the A/D (number of bits) are implementation design details that are application dependent and this does not detract from the general application of the invention.

In one embodiment of this invention, the A/D converter in block 4002 samples the 60 MHz pass band after the RF SAW filter which functions as an anti-aliasing filter and the sample rate is around 150 mega samples per second.

In one embodiment of this invention, the A/D converter in block 4002 samples the transmit and receive channels after the LNA, but prior to the SAW Filter and the sample rate is around 300 mega samples per second (in the PCS application, the transmit and receive bands span 140 MHz). This embodiment uses a copy of the transmitter feed thru signal to cancel the cross modulation. If the copy of the transmitter signal is received directly from the transmitter, then the A/D converter is placed after the SAW Filter.

In one embodiment of this invention, the output of the A/D converter 4002 is sent to two blocks, 4003 and 4004. The path thru 4003 is a near real time path, and the path to 4004 is a real time path. The search process 4003 depicted in FIG. 2 finds the location of the IMP source signals of interest and passes the control signals to the programmable digital filters in block 4004. Block 4004 isolates the IMP source signals and down samples the signals with decimating filters and reduces the sample rate to around 10 MHz (application dependent). As one versed in the arts will recognize, the down sampled rate is a function of the band width of the IMP source signals and is an implementation design detail and does not detract from the general application of the invention.

The signal path 4002 thru 4007 is a real time path that uses the copies of the signals that generate IMPs in 4001, 4009 thru 4011 to generate the cancellation signals.

The output of block 4004 is two signals that when multiplied to create $3^{rd}$ order IMP that will fall inband of the SOI. The output of 4004 is input to 4005 where the source signals are multiplied together to create the estimate of the IMP in path 4001, 4009 thru 4011. The product of the multiplication process is filtered to eliminate any extraneous products that might not be within the SOI band pass.

The IMP estimate is now passed to block 4006 where in the phase and amplitude adjustment functions will adjust the phase and amplitude of the IMP estimate to optimize the cancellation process. At the output of 4006, the digital signal is sent to blocks 4007 and 4008.

In one embodiment of this invention, the down conversion LO is tuned across the receiver band pass so that the channel assigned to the SOI will be down converted to zero IF. This is done in block 4009. Block 4009 provides analog filtering of the signal to reduce out of band interference prior to the sigma delta sampler 4010. In another embodiment of this invention, the down conversion is done to a low IF and the analog filters in block 4009 are band pass filters.

In one embodiment of this invention, the sigma delta sampler is a $2^{nd}$ or $3^{rd}$ order sigma delta sampler operating at 60 to 100 MHz sampling rate at 1 or 2 bits. The details of the selection of the parameters of the sigma delta sampler are implementation design details and are application dependent and these numbers are for exampled purposes and are not intended to limit the scope or application of the invention. As one versed in the art will recognize that the selection of the design parameters of the sigma delta sampler does not limit the general application of this invention.

In one embodiment of this invention, the output of the sigma delta sampler is input to a programmable decimating filter or a band of decimating filters in 4011 wherein the final SOI channel selection is made. The bandwidth of the SOI will determine the wireless standard to be processed. CDMA2000, AMPS, TDMA IS-136, GSM (including GPRS and EDGE), and WCDMA all have different bandwidths and will use a different decimating filter. The bank of decimating filters in 4011 provides the Multi-Mode Capability. The SOI at the output of 4011 will still have $2^{nd}$ and $3^{rd}$ Order IMPs that will be cancelled out in 4007.

Block 4007 receives the SOI (with IMPs) from block 4011 and the IMP cancellation signal from block 4006. The IMP cancellation signal is inverted in block 4006 and is added to the SOI in block 4007 to cancel the IMPs. The output of 4007 is sent to the base band processor and to the complex correlator block 4008. Block 4008 has received a copy of the cancellation signal that was used in block 4007 and now has a copy of the SOI after the cancellation process in 4007. The complex correlator in 4008 shifts the copy of the IMP cancellation signal by 90 degrees and computes the cross correlation with the SOI interest after correlation. This process computes the cross correlation of the residual phase. Block 4008 sends control signals to block 4006 to adjust the phase of the IMP cancellation signal in a dither type fashion until the cross correlation of the phase is at a minimum.

When the phase correlation in block 4008 has reached a minimum, block 4008 takes the non-phase shifted copy of the IMP cancellation signal from block 4006 and computes the cross correlation of the amplitude. Block 4008 sends control signals to block 4006 to adjust the amplitude of the IMP cancellation in a dither type fashion to minimize the cross correlation of the amplitude.

When the amplitude has been adjusted, the phase is adjusted and then the amplitude and so on in a continuous fashion until the IMP is no longer present or a larger IMP is cancelled instead of the first one. The algorithm will select the most damaging IMP and cancel it. The pass band is searched continuously and the algorithm selects the worse case IMP or IMPs if the multiple IMP cancellation is being performed. When one of the IMP source signals goes away, the cancellation signal also goes away because one signal gets multiplied by zero and the IMP cancellation signal goes to zero.

The IMP cancellation signal is always generated from the real time signals that reach the antenna and thus when they fade or experience Doppler or any other distortion, the signals used to develop the IMP cancellation signal change accordingly so that the signals that generate the IMP in the passband of the SOI and the signals used to generate the IMP cancellation signals are the same.

In one embodiment of this invention, the blocks 4004, 4005, 4006, and 4008 are duplicated to provide the capability to cancel multiple IMPs simultaneously. The blocks 4002 and 4003 do not need to be duplicated because the A/D converter has already sampled the entire receiver pass band and the search algorithm in 4003 computes the FFTs on the entire band, so all of the IMP source signals for multiple IMPs are found simultaneously. In the implementation for cancellation of multiple IMPs simultaneously, the search function 4003 sends controls to multiple blocks that perform the same functions as 4004.

In the embodiment of this invention where multiple IMPs are cancelled simultaneously, the cancellation block 4007 does not need to be duplicated it is just expanded to and multiple IMP cancellation signals. The IMPs will not be correlated, so the functions of block 4008 and its corresponding blocks in other cancellation paths, can be done simultaneously for multiple signals. The signal at the output of block 4007 is sent to multiple blocks that perform the complex cross correlation for each of the IMPs being cancelled.

In one embodiment of this invention, the cancellation of the second order IMPs generated by self mixing of high power blocking signals in the LNA and other analog components is performed as a subset of the $3^{rd}$ order IMP cancellation. In the case of the $2^{nd}$ order IMP cancellation, the blocking signal is squared after isolation in the block 4004, but the second signal is not used in block 4005 as is done in the $3^{rd}$ order IMP case. The IMP generated by the self mixing will manifest itself as a "modulated" DC offset and is a component of the DC offset interference.

In one embodiment of this invention, the DC offset generated by Doppler shift, LO feed thru and time varying offsets of the analog components are canceled by a technique similar, but simpler than the IMP cancellations discussed above. In this case, the clock of the digital signal at the output of block 4007 is sampled and the DC cancellation signal is generated (all values the same) and this DC cancellation signal is subtracted from the signal of interest. The output of the DC cancellation process is input to a simplex amplitude cross correlator and the value of the DC offset cancellation signal is adjusted to minimize the cross correlation as was done the $3^{rd}$ order IMP cancellation process.

In one embodiment of this invention, the DC offset cancellation process sends control signals to the analog DC offset control circuits and the analog circuits control the more slowly varying portion of the DC offset digital portion controls the more rapidly varying components and cleans up the signal just prior to hand off to the baseband processor. The rate of update on the DC offset compensation can be adjusted to control the "bandwidth" of the DC offset cancellation process as required by each implementation.

Sub-Sample Phase Shifting

Figure 5:
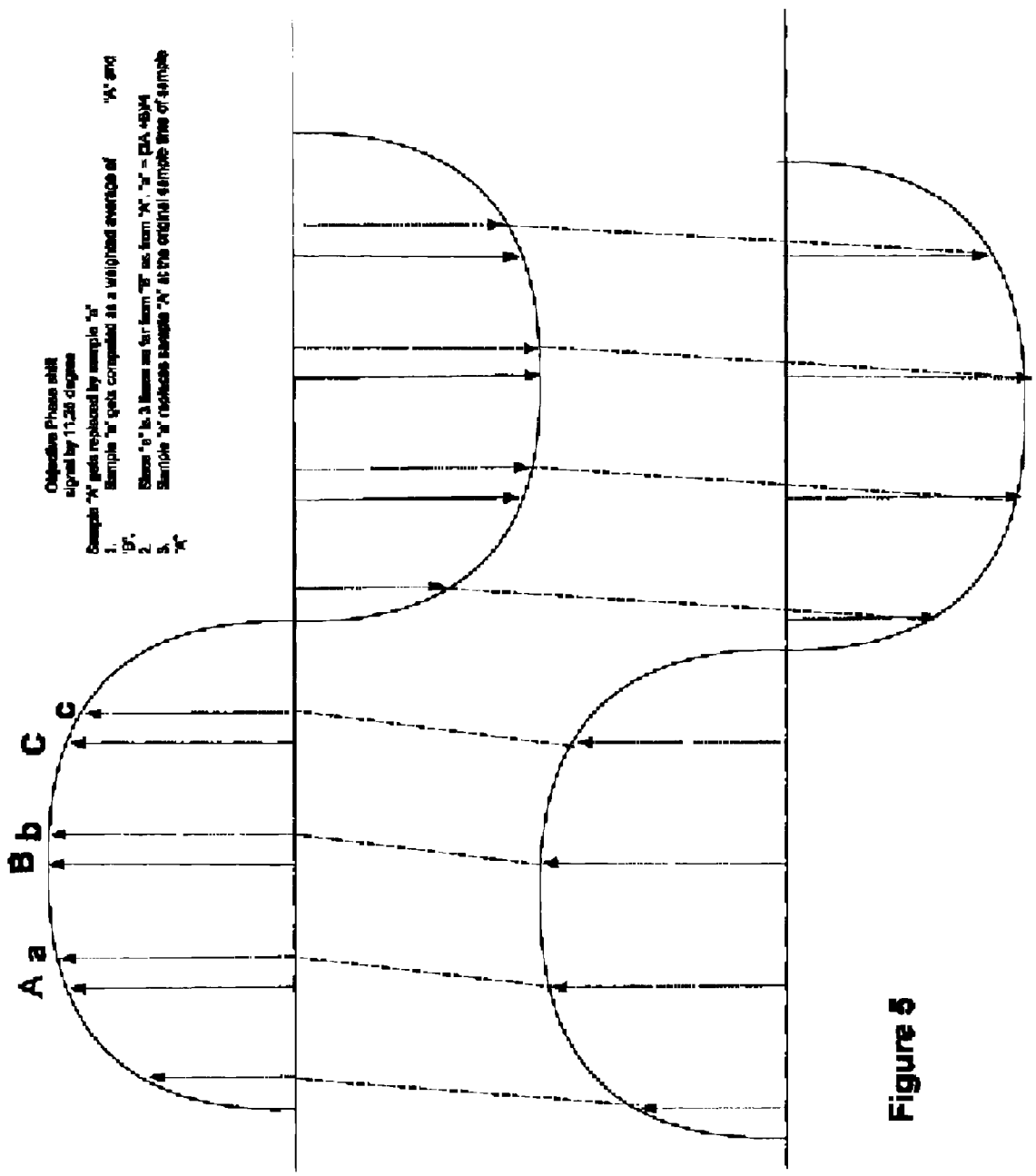
FIG. 5: Sub-Sample Phase Shifting

The IMP cancellation signal may be adequately over sampled from a Nyquist point of view, but if the signal is delayed by full sample times in block 4006, the phase shift may be too large to accurately align the IMP estimated cancellation signal with the IMP in the SOI. To solve this problem, a sub-sample phase shifting technique is used. FIG. 5 shows how this technique works. The top waveform has original samples "A", "B" and "C". A new set of values are computed by performing an interpolation of the values between the two values of "A" and "B" and "C" to get "a" and "b" and "c". The new values "a" and "b" and "c" are mapped into the time slots of the samples "A", "B" and "C", thus delaying the samples by a sub sample increment and thus performing a sub-sample phase shift.

Figure 6:
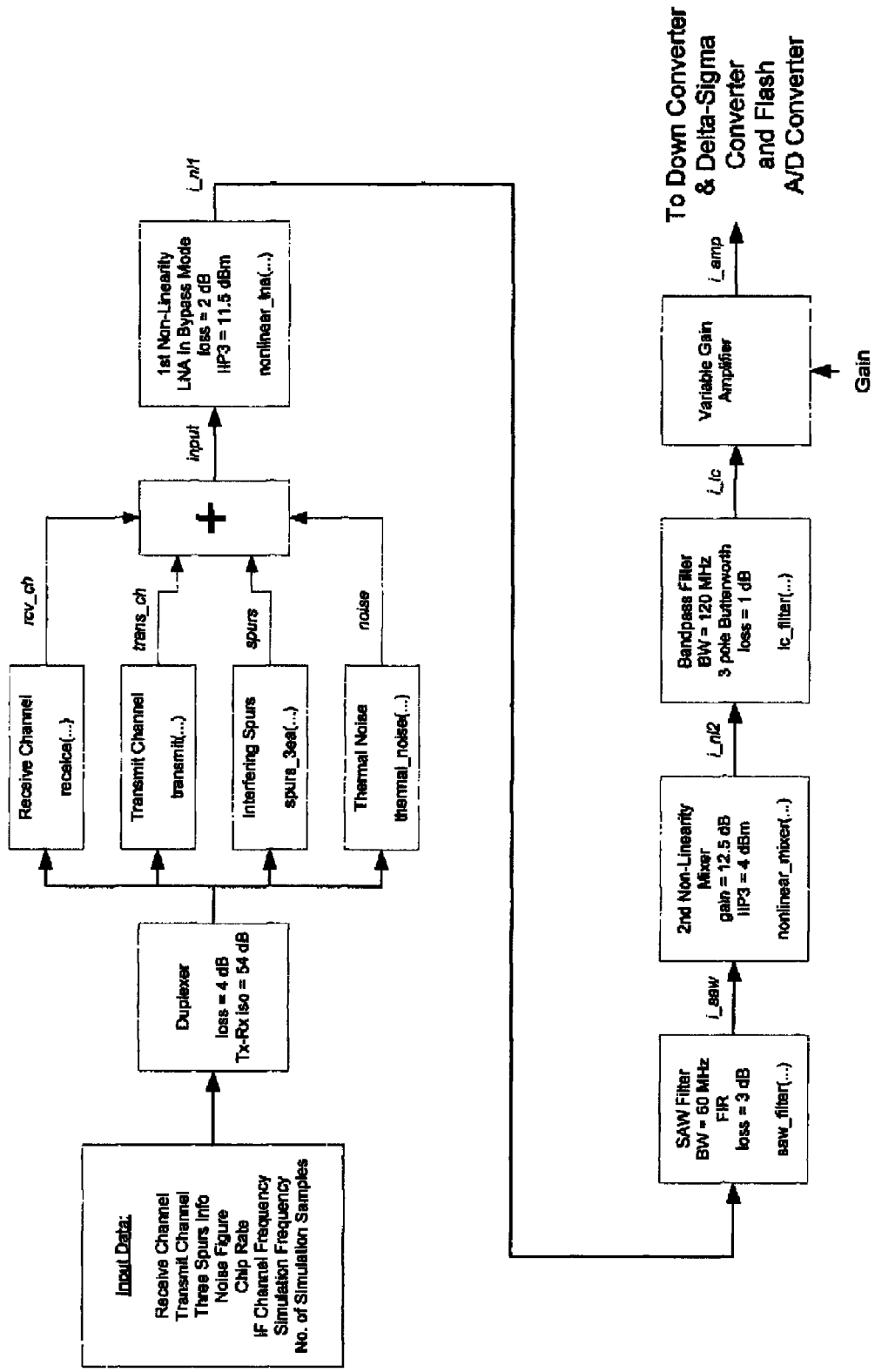
FIG. 6: MATLAB Top Level System Simulation Block Diagram

MATLAB Simulations:

The top level architecture of the invention was simulated in MATLAB and the top level simulation architecture is shown in FIG. 6. The interference case simulated was the CDMA2000 high power two tone intermodulation test. The simulations were run for both tone IMP source signals and for a modulated IMP source signal set. In this case, the signal of interest is at −94 dBm and the IMP source tones are at −21 dBm. The values used for the analog parameters were nominal industry values for IIP2, IIP3, Gain, Insertion loss and Noise figure.

Figure 7:
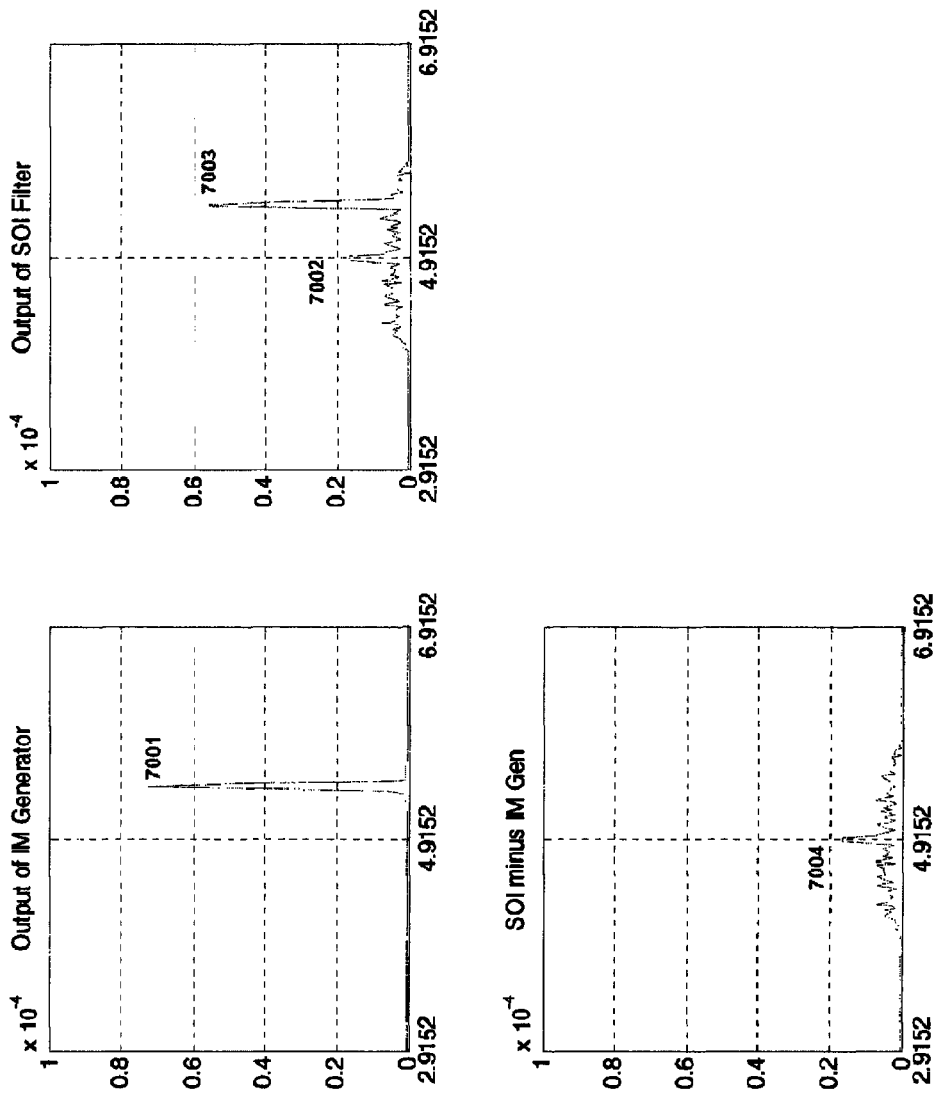
FIG. 7: MATLAB System Simulation, Two Tone Test, CDMA2000

The results of the two tone test with tones as the source of the inband IMP are shown in FIG. 7. The IMP estimate of the IMP cancellation signal is 7001. The signal of interest (SOI) is 7002 and the inband intermod produced by the analog components of the system is 7003. The result of the cancellation process after the phase and amplitude adjustment of the IMP cancellation signal is shown in the lower left hand figure and only the SOI 7004 remains. Note that the CDMA2000 signals 7002 and 7004 are shown as tones. These are actually CDMA spread spectrum signals and they would be below the noise floor if spread, so they have been depicted as tones for comparison to the level of the IMP.

Figure 8:
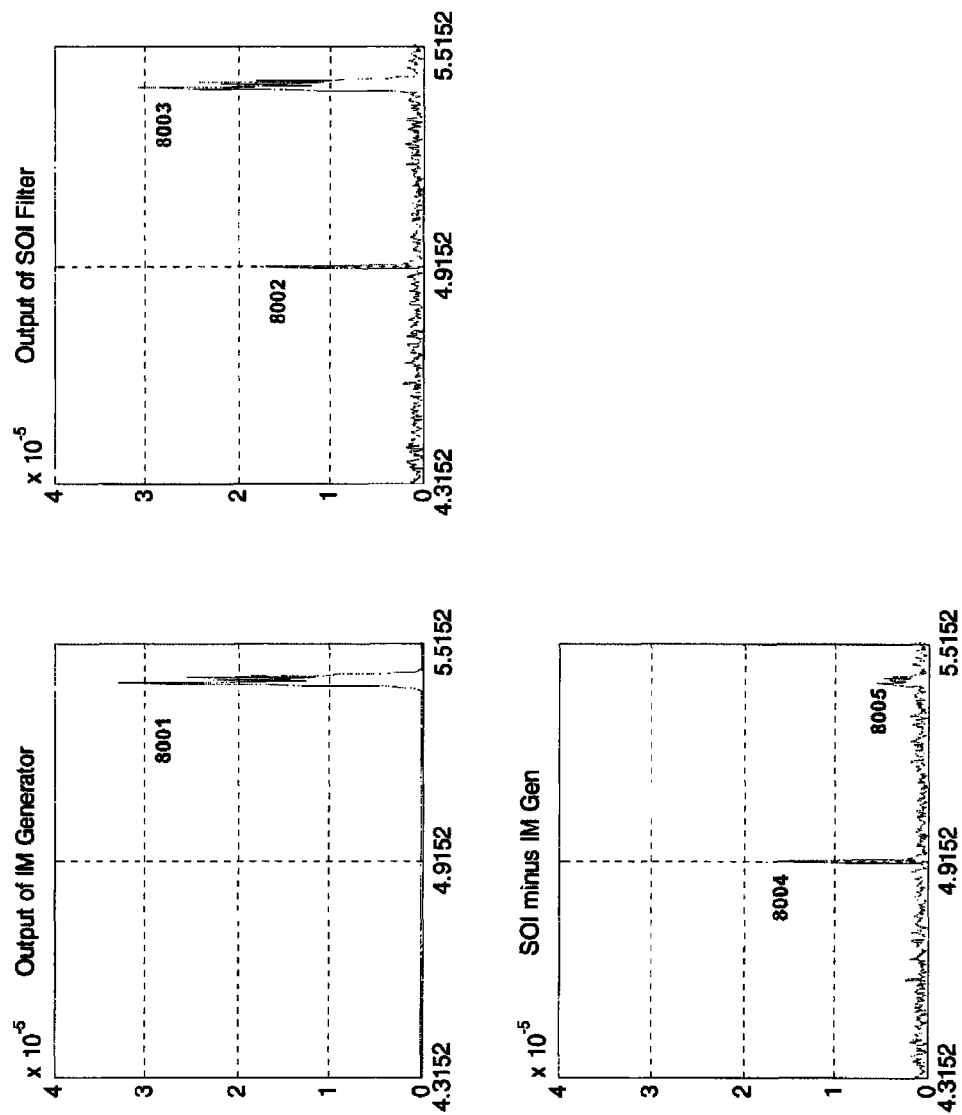
FIG. 8: MATLAB System Simulation Two Tone Test CDMA2000 with AMPS Signals Generating Intermodulation Products

In reality, the IMP source signals will most likely be modulated signals so a case was simulated for two signals that were 30 kHz FM AMPS signals. The results of that simulation are shown in FIG. 8. The estimate of the IMP cancellation signal is 8001 and the signal of interest (SOI) is 8002 and the inband IMP generated by the analog components of the system is 8003. The result of the cancellation process after the phase and amplitude adjustment of 8001 is shown as 8005. There is a little residual of the IMP, but this can be managed by close attention to the differential group delay which can be managed in the FIR (finite impulse response) filters.

Multi-Band Multi-Mode Implementation

Telephony CDMA2000, AMPS, TDMA, GSM, 3G-WCDMA

Figure 9:
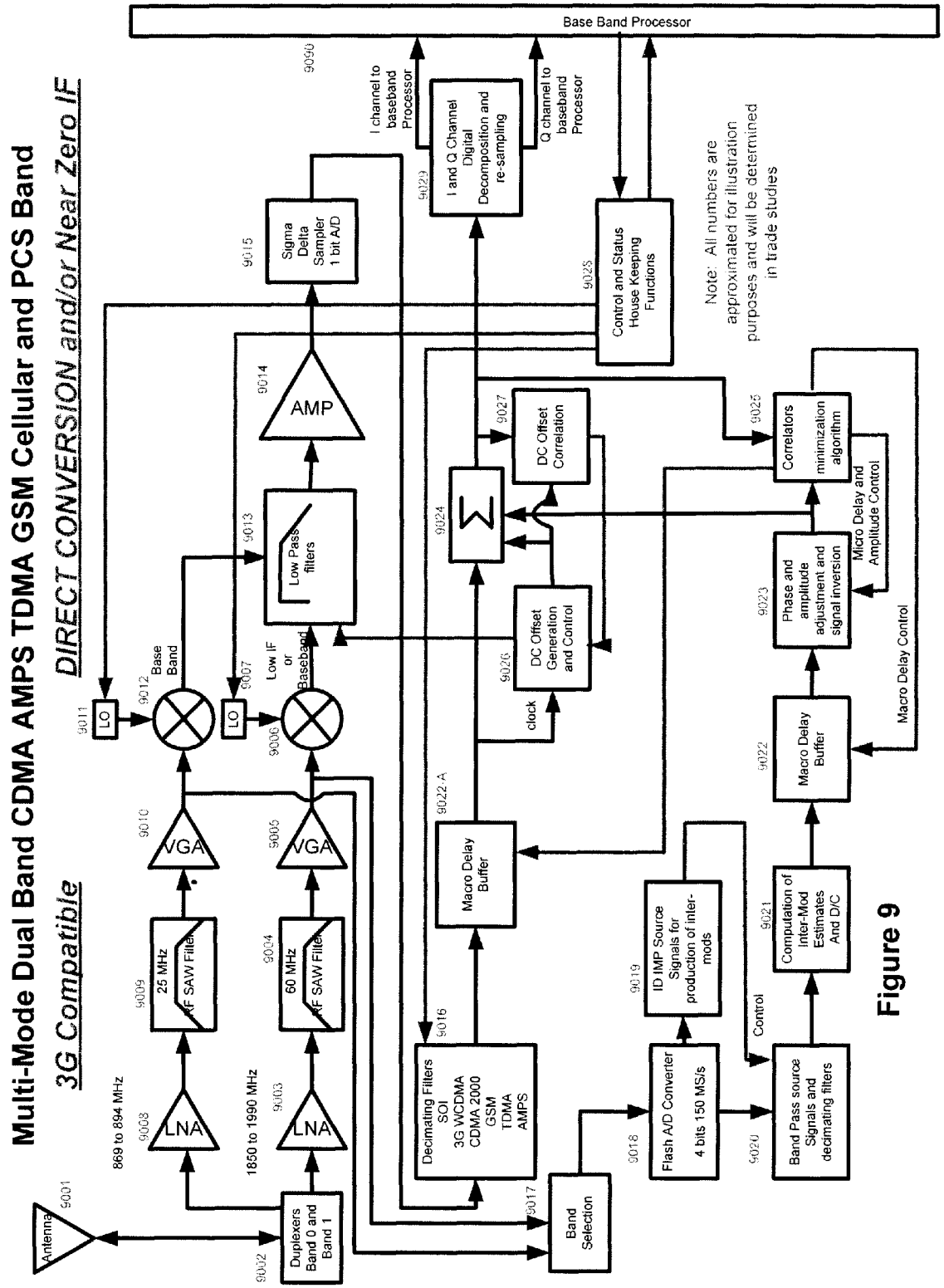
FIG. 9: Multi-Mode Dual Band CDMA, AMPS, TDMA, GSM, WCDMA, Cellular and PCS Band

FIG. 9 shows the top level architecture for a Multi-Mode Dual Band Cellular Telephony Mobile Receiver. The processes described herein are performed for both the I and the Q channel for a direct conversion receiver. If a Low IF is used, the interference cancellation is done at the Low IF and the I Q decomposition is in block 9029 by taking four samples and averaging the $1^{st}$ and the $3^{rd}$ to get one channel and the $2^{nd}$ and the $4^{th}$ to get the quadrature channel.

In one embodiment of this invention as shown in FIG. 9, The Antenna 9001 receives one or more signals from one or more frequency bands, typically one band at a time. The received RF energy is filtered in the duplexer 9002 to isolate the transmitter and receiver bands for applications requiring full duplex operations. For mobile telephony applications, the entire receive band of nominally 25 to 60 MHz and sometimes up to 100 MHz has to be received since the assigned channel is not known a priori. The output of the duplexer is input to a low noise amplifier (LNA) with the appropriate band pass as shown in 9008 and 9003. In half duplex applications without a duplexer, the SAW filter often precedes the LNA.

In one embodiment of this invention, the output of the LNA is filtered by an RF filter, which may be a surface acoustical wave (SAW) filter to reduce signal strength outside of the receive band. In another embodiment, there may or may not be an RF filter if the duplexer and subsequent filtering provide sufficient out of band signal suppression. In another embodiment, there is no duplexer and the SAW filter is placed prior to the LNA In one embodiment of this invention, the LNA has a bypass function under the AGC control for bypassing the LNA when very large blocking signals are present. In one embodiment of this invention, the VGA 9005 or 9010 controls the amplitude of the signal into the down conversion mixers 9006 or 9012 and the flash A/D 9017/9018.

In one embodiment of this invention, the LO (local oscillator) 9011 or 9007 is tunable so as to place the SOI at a given frequency when the down conversion is performed. In one embodiment of this invention, the LO can support frequency hopping such as for the GSM signal when it is frequency hopped.

In one embodiment of this invention, the output of the down conversion mixer 9006 or 9012 is at DC or a near zero IF (typically a few hundred kHz depending on the bandpass of the down converted signal). The near zero IF must be high enough to preclude aliasing of the signal. This will typically be from ½ to 2 times the passband signal bandwidth.

In the case of GSM, the near zero IF can be around 100 KHz since the GSM signals are on 400 KHz spacings and this will preclude aliasing of energy with the near zero IF. When this is done, the I and Q can be de-composed digitally for the near zero IF signal.

In one embodiment of this invention, the output of the down conversion mixer 9006 or 9012 is filtered with an analog filter that is either a low pass filter or a band pass filter 9013. The bandwidth of the analog filters is a function of the signal bandwidth being processed. In one embodiment of this invention, the output of the analog filter is amplified by the amplifier 9014 to set the appropriate level for the Sigma Delta A/D converter. In another embodiment of this invention, the A/D converter is a flash A/D.

In one embodiment of this invention, the blocks 9013 or 9014 have DC offset compensation circuits that adjust the DC offset under control of block 9026.

In one embodiment of this invention, only one mixer is used for each band as apposed to two when down converting I and Q via an analog process (Low IF case). The signal is retained as a composite signal until the very last step in the process 9029 where the final digital down conversion is done and the I and Q signals are decomposed digitally. This simplifies processing and control and eliminates problems with I-Q quadrature and amplitude imbalance.

In one embodiment of this invention, the mixers 9012 and 9006 are quadrature mixers which down convert the I and Q channels.

Sigma Delta Sampler:

In one embodiment of this invention, the output of the amplifier 9014 is over sampled by the sigma delta A/D converter 9015 at an over sampling rate between approximately 32 and 64 with a $2^{nd}$ or $3^{rd}$ order sigma delta loop at 1 or 2 bits. The specifics of each embodiment are a function of the signal set to be processed. As an example, when processing 3G wideband CDMA (WCDMA), the signal band width is 3.8 MHz, The Nyquist bandwidth is twice that or 7.6 MHz. A $3^{rd}$ order 1 bit sigma delta A/D converter sampling at 250 mega samples per second will yield an over sampling ration (OSR) of 250/7.6=33 and will yield a SNR of about 85 dB. The decimating filters are used to reject the blocking signals and trade the OSR for SNR. The SNR result of the output of the decimating filter is sufficient to yield 14 bits if required and capture the SOI and the blocking signals. This provides for the blocking signals to be filtered out and the SOI to be recovered. The quantization can be as high as 13 to 14 (1 bit per 6 dB of SNR) bits, but most applications do not require this (most telephony and WLAN and PAN require 4 to 6 bits). The smaller number of bits saves power and gate counts. As one versed in the art will recognize, the details of the design of the sampler are design details and are application dependent and does not detract from the general application of the invention.

In one embodiment of this invention, the OSR is variable to accommodate different SOI bandwidths. This will save power in that the sampling ratio of the sigma delta is proportional to the sampling rate. The decimating filters are also variable. The flash A/D at 4 bits also can be adjusted in sampling rate to save power. In one embodiment of this invention, there is one sigma Delta A/D for each channel I and Q.

Decimating Channel Selection Filters:

In one embodiment of this invention, the SOI decimating filters 9016 are a bank of fixed or programmable filters. Only the filter selected for use on a given signal is powered up at a time and thus the additional filters do not impact the power budget. The additional filters do take up additional gate count and space, but the required gate count is low and is of little impact, especially on small geometry semi-conductors (such as 0.18 um and below.) The decimating filters narrowband filter the SOI and down sample signal to provide high rejection of out of band signals and improve the SNR by trading the high sample rate for a low sample rate to get a higher SNR. The output sample rate from the decimating filters 9016 is a function of the signal being processed. In one embodiment of this invention, the 9016 output sample rate varies from 10 Mega Samples per second to 20 Mega Samples per second. The number of bits of quantization will typically vary from 4 to 8 bits depending on the resolution required. With the OSR required to get around 84 dB of instantaneous dynamic range, up to 14 bits can be delivered to the baseband processor. The block 9016 may have multiple filters for different standards such as CDMA9000, AMPS, TMDA, GSM, EDGE, 3G WCDMA etc. The filters that are not being use need not be power thus providing a power savings. The sampling rates, bit of quantization and bandwidth of the decimating filters are a function of the standard being supported.

Interference Cancellation:

In one embodiment of this invention, the output of the decimating filters 9016 is input to the summing and cancellation block 9024 where cancellation signals cancel the $2^{nd}$ and $3^{rd}$ order intermodulation products and the DC offset as discussed below. In another embodiment, the signal is delayed to in block 9022-A to align the timing between the SOI and the inter-mod cancellation signals as discussed below. The SOI is then sent to the summing and interference cancellation block 9024.

In one embodiment of this invention, after the intermodulation products and the DC offset interfering signals have been cancelled in the summing block 9024, the signal is input to the 9029 wherein the final digital down conversion (for a near zero IF) and the decomposition of the signal into the I and Q samples is performed. The digital samples are taken in groups of four and the $1^{st}$ and the $3^{rd}$ are averaged together and the $2^{nd}$ and the $4^{th}$ are averaged together to get the I and Q samples and improve the SNR by 3 dB. If the sampling rate needs to be increased at this point, the signals are up sampled and output to the base band processors. The I and Q samples are orthogonal, but may not be coherent, and vector de-rotation may be required as is typically done in the baseband processors. If coherent detection is required, a phase lock loop or similar technique can control the selection times on the four samples used for the I and Q decomposition. All of the information is present, because what is not in I is in Q and what is not in Q is it. When the de-rotation is performed, the information will be correct.

Generation of IMP Cancellation Signal:

In one embodiment of this invention, the signal is split after the variable gain amplifier (VGA) 9006 or 9010. One copy of the signal is sent to band select block 9017 which may contain an anti-aliasing filter if required to limit the band pass prior to being sampled by the flash A/D converter 9018. In one embodiment of this invention, the filter 9017 is not included and the anti-aliasing is performed by the RF filter 9004 or A009.

The over sampling 4 bit A/D converter 9018 samples the entire receive passband at rates from 150 to 250 mega samples per second depending on the bandwidth of the receive band in use. (Depending on the application and the required resolution, the number of bits may vary from 2 to 6). The output of the flash A/D goes to two locations, the ID IMP Source Signals search block 9019 and the Band Pass source signals and programmable decimating filters 9020. IMP Source Signals are signals that are in the receive band, but not in the SOI band, that mix in the non-linear elements of the receiver to produce $2^{nd}$ and $3^{rd}$ intermodulation products that fall inband of the SOI. Block 9019 finds the source signals that can product SOI inband inter-mods and passes those frequencies to the block 9020 for filtering to isolate the source signals as shown in FIG. 2 and FIG. 3. The process for the search and the IMP cancellation are discussed in detail below.

In one embodiment of this invention, the block 9019 searches the entire receive band as passed by the RF filter 9004 or 9009 and identifies the location of source signals which are positioned within the receive band such that the $2^{nd}$ or $3^{rd}$ order products can fall inband of the SOI. The search algorithm then selects the highest power signals that can produce an SOI inband inter-mod. There may be higher power signals in the receive pass band, but if they are not paired with the appropriate spacing, their $3^{rd}$ order inter-mods will not be of concern. These signals may still be of concern with respect to $2^{nd}$ order self mixing products.

In one embodiment of this invention, the algorithm is implemented to find and isolate one or more pairs of source signals that can produce SOI inband inter-mods. In this case, multiple frequencies pairs are sent to the decimating filters in block 9020 from 9019.

In one embodiment of this invention (as shown in FIG. 2 and FIG. 3), the search algorithm breaks the receive band into 3 MHz blocks and computes the 20 point Fast Fourier Transform (FFT) with one component for each block to find the location of the highest level of energy in the pass band. For those blocks that have an appropriate relationship, such that they could produce SOI inband inter-mods, the search algorithm breaks the 3 MHz blocks into 300 kHz blocks and computes the 10 point FET, for each, to find the signals that can produce inband inter-mods. This algorithm in not computationally intensive and the search is repeated continually to find the most troublesome source signals. The search can be completed on the sub millisecond time frames depending on the implementation. The frequency resolution of the FFT is 1/NT where T is the sampling time and N is the number of samples. To get a frequency resolution of 300 kHz, where $T=\frac{1}{150} \times 10^6$, the number of samples required is 500 samples. This takes 0.4 microseconds to collect. The speed of the search processing can be made to be very fast by using parallel digital implementation.

Decimating Filters for IMP Source Signals:

In one implementation of this invention, the decimating filters, block 9020, for the source signals can have one or more sets of two filters to process one or multiple inter-mod cancellation signals. As shown in FIG. 2 and FIG. 3, the decimating filters are nominally 300 to 400 kHz wide and are only a few poles. When canceling IM produced by wider signals, the filters will be wider (such as GSM and WCDMA). The decimating filters can be varied as a function of the bandwidth of the IMP source signals. The filtered IMP source signals will be multiplied together in the time domain to create the estimate of the inter-mods produced by the non-linearities in the receive channel as shown in FIGS. 2 and 3. An accurate representation of the IMP source signals in the time domain is desired to produce, as accurately as possible, the estimate of the intermodulation signals, so the filters must pass a significant portion of the energy in the side lobes of the signals. The generation of the estimate of the inter-mods is done in block IMP Estimate Generation:

In one embodiment of this invention, block 9021 multiplies the source signals together to create an estimate of the intermod(s) that will fall inband of the SOI. The result of the inter-mod estimate generation is then filtered with a copy of the SOI filter (same band pass as for the SOI in 9016) to reject any intermod components that are not inband of the SOI.

In one embodiment of this invention, the estimate of the intermod could be delayed or advanced relative to the SOI. The macro delay buffers 9022 and 9022-A are used to do an approximate delay adjustment (plus or minus whole sample times) to compensate for differential delay in the receive signal of interest (SOI) path and the path for the generation of the estimate of the inter-mod. These delays are used to get within a sample of the desired phasing of the two signals. In an alternate embodiment of this invention, the blocks 9022 and 9022A are the same block and either the SOI or the inter-mod estimated signal is delayed in the block. In one embodiment of this invention, a test tone is injected into the block 9005 or 9010 to determine the macro offset required when the mobile unit is tuned on. This function is then continuously updated as required during operation with the micro adjustment being done in block 9023 as described below.

Block 9023 provides the fine adjustment of the amplitude and phase of the IM estimate to cancel the IM generated by the nonlinear elements of the receive chain in the SOI band. Block 9023 inverts the estimate of the IM so that when it is added to the SOI, the energy in the IM will be cancelled (as shown in FIG. 3). This function can be performed for as many IM cancellations as required, and it can be done simultaneously.

In one embodiment of this invention, the output of the block 9023 is input to the summing block 9024 wherein the inverted estimate of the inter-mod is used to cancel the channel induced inter-mod. This block may add one or more cancellation signals to cancel one or more inter-mods. The output of 9023 is also sent to the correlation block 9025 which also receives a copy of the SOI after the cancellation process 9024. Block 9025 is a complex correlator which provides phase and amplitude control signals to block 9023 to minimize the correlation between the SOI and the estimate of the inter-mod. If the cancellation is done perfectly, the cross correlation will be zero. Block 9025 executes a dither or similar algorithm to minimize the cross correlation. In alternate embodiments of this invention, block 9025 has multiple complex correlators to process multiple signals for the cancellation of multiple inter-mods.

In one embodiment of this invention, block 9023 performs a sub-sample phase shift on the inter-mod estimation signal as shown in FIG. 5. In many situations, the samples of the signal may be above the Nyquist rate, but only provide a few samples per cycle of the waveform. In the situation, a simple delay of samples (macro delay 9022 and 9022-A) will not provide sufficiently accurate phase shifting to adjust the inter-mod estimation signal to cancel the SOI in-band inter-mods. In one embodiment of this invention, the technique shown in FIG. 5 is used, interpolating between samples and then mapping the new values into the time slots of the original samples. By using this technique, the phase shift can be made arbitrarily small. The amplitude adjustment is made by simple scaling.

In one embodiment of this invention, block 9025 control signals instruct block 9023 to adjust the phase offset first and then adjust the amplitude of the inter-mod estimates to minimize the residual correlation between the SOI and the inter-mod estimate in block 9025. This will provide the best cancellation of the SOI inband intermodulation products.

In one embodiment of this invention, the Block 9021 computes the estimate of the intermod based on real time signals. When one or the other of the source signals goes away, the intermod-estimate goes to zero since one of the signals is multiplied by zero. When the search algorithm does not find any interfering signals that can produce SOI inband inter-mods, the input to the summing circuit from 9023 is turned off. Block 9019 continues to search for inter-mod source signals and will select the largest set for cancellation processing, when the source signals meet or exceed a selected amplitude threshold.

In one embodiment of this invention, block 9025 cross correlates multiple signals from 9023 with the SOI after inter-mod cancellation. Since the inter-mods are not correlated, the cross correlations can be computed simultaneously and the phase and amplitude controls for each inter-mod being processed and can be sent simultaneously to block 9023. In this way, one or more inter-mod cancellation signals can be processed and cancelled simultaneously.

Differential Group Delay Compensation:

In one embodiment of this invention, if the group delay for the source signals (and thus the inter-mods generated) for the SOI receive channel are different from that of the inter-mod estimation generation, the decimating filters used in block 9020 can contain FIR filters that can introduce the appropriate group delay. It is envisioned that this will not be a significant problem because the analog elements in the SOI receive chain are very broadband with respect to the source signals and over a narrow portion of the pass band, the amplitude and phase are usually pretty constant. If the problem does exist, the FIR filters in block 9020 can mitigate the problem.

In different embodiments of this invention, the estimate of the intermod generation and the cancellation process are done at varying levels of resolution nominally from one to six bits. Each bit of cancellation provides 6 dB of suppression of the intermod. In some applications, it may be desirable to only use a few bits for the cancellation process and in some cases only 1 bit. If the MSB is correct, the inter-mods will be suppressed by 6 dB. If the two MSBs are accurate the inter-mods will be suppressed by 12 dB, 3 bits provide 18 dB and 4 bits provide 24 dB of IMP suppression. Due to the fact that only a couple of bits of cancellation are required in most cases, the variations in the group delay between the two channels most likely will not be significant.

Figure 11:
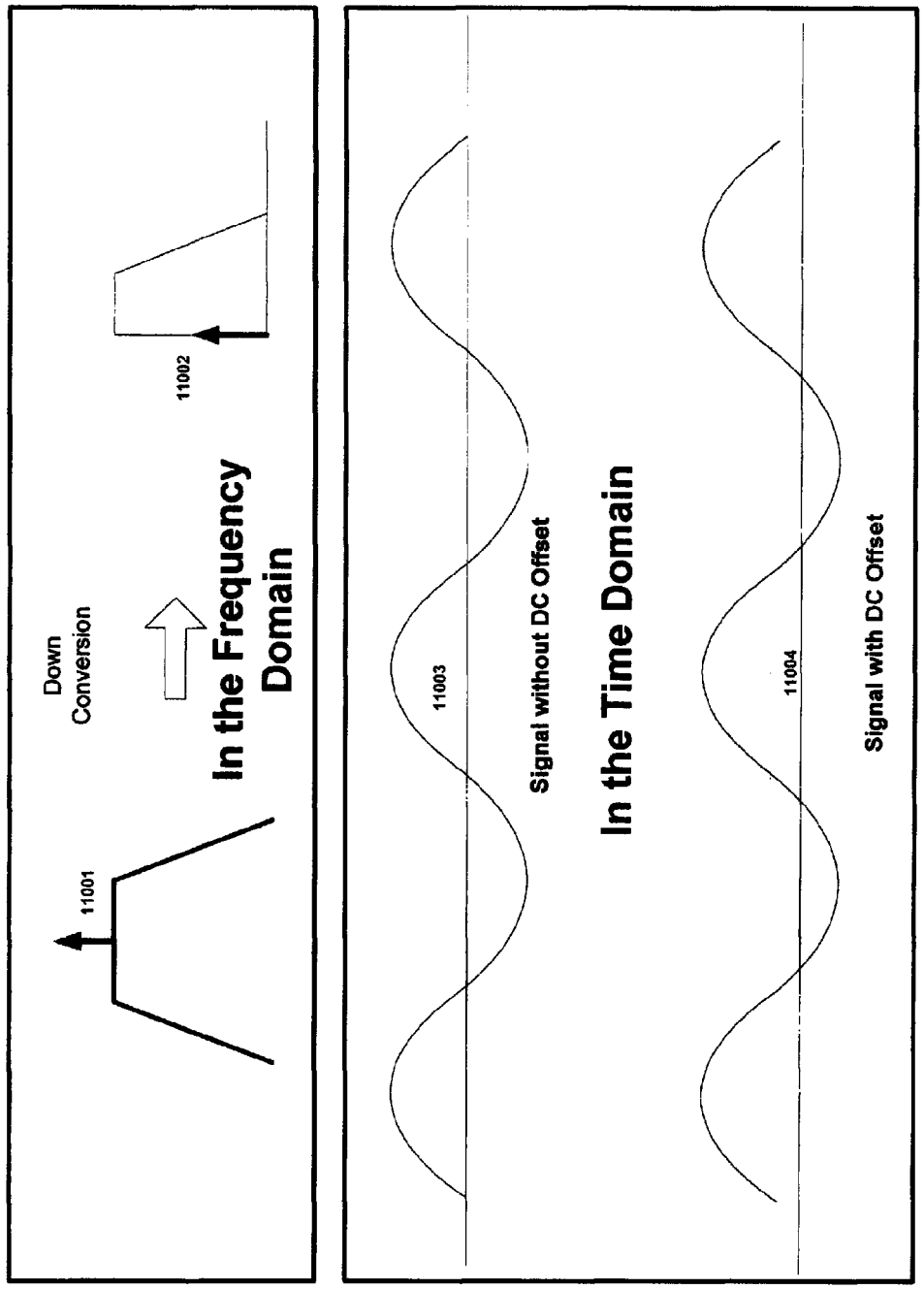
FIG. 11: DC Offset Caused by LO Feed Thru

DC Offset Compensation:

In one embodiment of this invention, the SOI is converted directly to baseband and in another, it is converted to a near zero IF. In the case of the conversion directly to baseband, DC offset can be a problem. This can be a time varying phenomena. The DC offset can have several components, some of which are slowly varying and some the change more rapidly. The mechanisms that cause DC offset interference include LO feed thru, Doppler shift, time varying DC offset in the analog components, and $2^{nd}$ order self mixing of large blocking signals in the receiver passband. Some architectures, where only half duplex operation is required (such as GSM), will take the receiver circuits offline during the time lapse between received packets and will calibrate the DC offset correction. This is not a perfect solution since the offline circuit is not identical to the operational circuit. This technique will not work with full duplex systems. The problems presented with DC offset are two fold. If the DC offset gets too large in the analog circuits, the circuits may be experience signal compression and thus signal distortion. The second problem is that the signal that is sent to the baseband processor will have the wrong signal values as shown in FIG. 11.

In one embodiment of this invention, block 9026 takes the clock off of the SOI word stream and generates a word stream with a constant amplitude (or a DC signal). This value is inverted and input to the summing circuit 9024 and it is used to cancel the DC offset in the SOI. The output of the block 9024 is sent to the DC Offset correlation 9027 which has also received a copy of the DC offset cancellation signal from block 9026. The cross correlation between the SOI and the DC offset cancellation signal is computed and a control signal sent to 9026 to adjust the amplitude of the DC offset cancellation signal until the cross correlation in 9027 is at a minimum. This cross correlation and correction of the amplitude of the DC offset can be done rapidly by taking a few thousand sample snap shots of the signal to be cross correlated. The correlator for the DC offset need not be a complex correlator because there is no phase offset to be concerned about. The update rate for the DC offset correctly can be done at any rate up to several MHz. The update rate will be selected based on the parameters of each implementation.

In one embodiment of this invention, the correlation function controls the DC offset correction in both an analog and digital manner.

In one embodiment of this invention, the block 9026 uses one of two or a combination of two processes to compensate for the DC offset. The first is the digital process discussed above and the second is with a control signal sent to block 9013 wherein the DC offset control is done with analog circuits.

In another embodiment of this invention, the SOI is down converted to a near zero IF and the decimating filter in block 9016 is a band pass signal which eliminates the DC terms prior to the final digital conversion to baseband in block 9029. In this situation, the block 9026 may not be required.

When the DC offset is caused by a self mixing of a high power blocking signal with amplitude modulation, the offset induced by this signal is cancelled in a subset of the $3^{rd}$ order IMP cancellation process. In this case, the single signal is squared and low pass filtered to acquire an estimate of the $2^{nd}$ order IMP at baseband. The adjustment of the phase and amplitude is the same as described for the $3^{rd}$ order IMP cancellation process.

Figure 10:
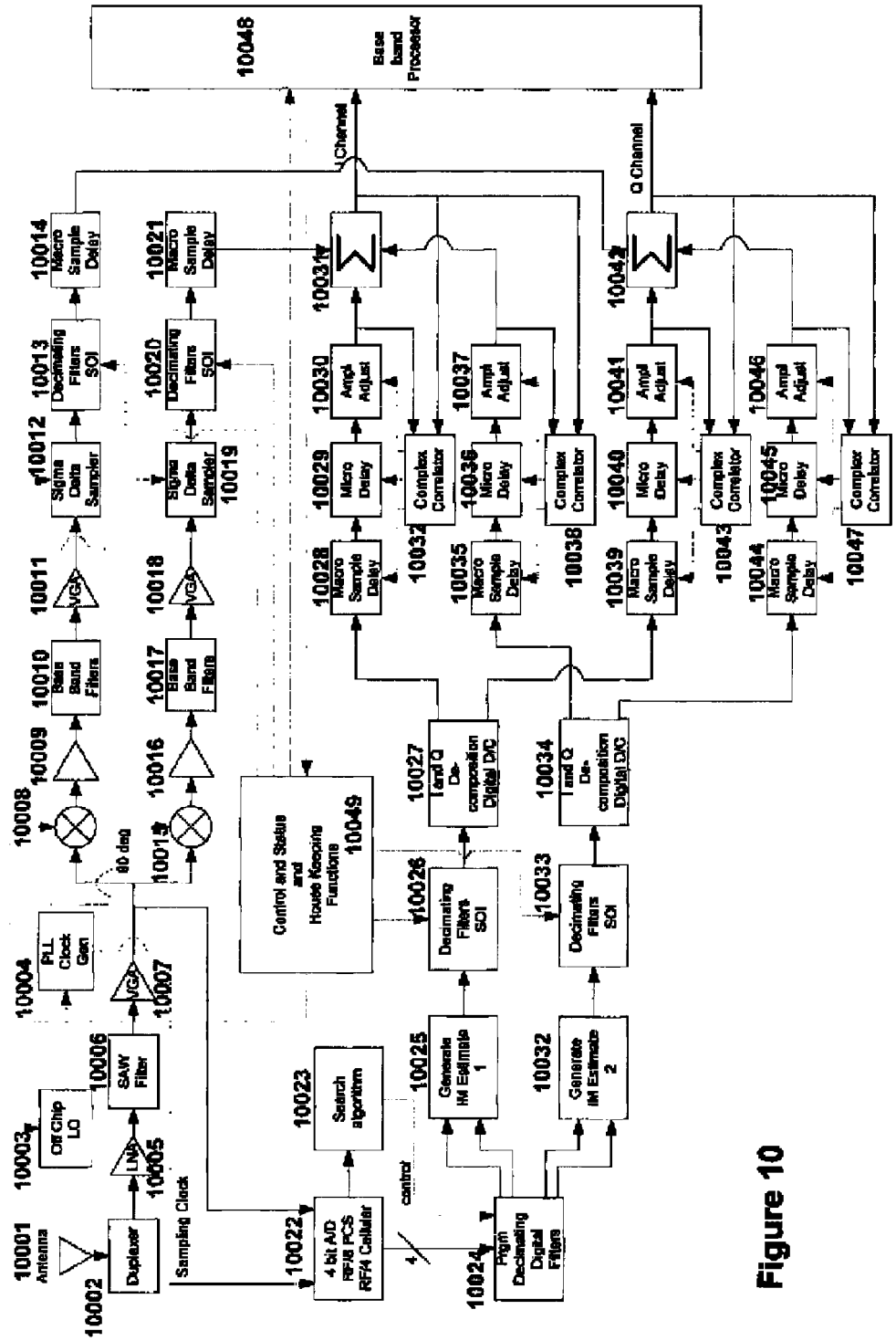
FIG. 10: Direct Conversion Two Inter-Mode Case with I and Q Channel Cancellation

Multi-Standard Direct Conversion Receiver with Cancellation of Multiple Inband Intermodulation Products In one embodiment of this invention, as shown in FIG. 10, there are quadrature mixers which down convert the RF signal to the I and Q baseband where the signals are filtered with baseband analog filters to suppress close in blocking signals prior to the sigma delta A/D converters. The I and Q channels are processed separately and the interference is cancelled on each channel simultaneously. In another embodiment of this invention, a flash A/D may be used.

FIG. 10 shows an implementation with one receive band, but this is only an example and as one versed in the art will recognize, it is readily expandable to a multi-band application and the appropriate addition of complementary blocks to 10001 thru 10008 and 10015. The numerical parameters used herein are intended for explanation of the invention and are not intended to limit the scope of the invention. The numerical parameters may change with different applications of the invention. As one versed in the arts will recognize, the selection of the different numerical parameters is a design detail and is application dependent and does not detract from the general application of the invention.

RF Front End:

In one embodiment of this invention, as shown in FIG. 10, the antenna 10001 receives the full telephony receive band from either the Cellular band or the PCS band (25 to 60 MHz and may be different for international applications—possibly up to 100 MHz). The duplexer 10002 filter provides suppression of the transmit feed thru signal and other unwanted signals outside the desired receive band. The receive band is amplified by the LNA 10005 and then the receive band is filtered again in the RFSAW filter 10006. The variable gain amplifier 10007 provides gain control prior to the down conversion process.

In one embodiment of this invention, the receiver is configured for half duplex operation and there is no duplexer in the receive chain. In this case, the RF SAW filter may be place prior to the LNA to limit the excess noise bandwidth and reject unwanted out of band signal energy. In this case, the $2^{nd}$ order self mixing of high power blocking signals with amplitude modulation can create a modulated $2^{nd}$ order IMP at baseband.

In one embodiment of this invention, the SAW filter 10006 may be eliminated when the duplexer 10002 and the baseband analog and digital filters provide out of band rejection.

Coherency and Direct Down Conversion, LO and Sampling Clock:

In one embodiment of this invention, the output of 10007 is split into three signals. Two of the signals are routed to the I and Q down converter mixers 10008 and 10015. The third copy of the signal is sent to block 10022 to support the intermodulation products cancellation process as discussed below.

In one embodiment of this invention, the IMP estimate of the cancellation signal must be kept coherent with the SOI which is directly converted to baseband or zero IF or low IF. This is achieve by making the sampling clock of the A/D converter 10022 coherent with the LO used for the direct down conversion.

In one embodiment of this invention, a local oscillator 10003 provides a reference signal to the phase lock loop (PLL) 10004. The PLL block 10004 provides the RF reference signal for the direct conversion process for either the cellular band or the PCS band. Block 10004 also provides the clock signal for the flash A/D converter 10022 which is part of the intermodulation products cancellation process.

In one embodiment of this invention, the sampling clock is made to be coherent with the down conversion reference signal. In one embodiment the sampling clock is kept coherent with the down conversion reference signal by creating the sampling clock by dividing the reference by 8 for the PCS band and by 4 for the Cellular band. This creates a sampling clock that is well above the Nyquist sampling rate for the 50 or 100 MHz receive band for the Cellular and PCS band respectively. The subsequent digital down conversion and sub-sampling will now be kept coherent with the SOI and this will aid significantly with the IMP cancellation process.

In another embodiment of this invention, the reference signal for the direct conversion is at the appropriate frequency for bands for the outside the United States. The sampling clock is still kept coherent to aid in the cancellation process. As will be discussed below, the IMP cancellation signal will be separated into I and Q for cancellation of the IM interfering signals in each of the I and Q channels.

In one embodiment of this invention, the PLL 10004 generates the reference signal and a 90 degree shifted version of the signal. These two signals are input to the mixers 10008 and 10015 where they are used to down convert the I and Q signals to baseband. The I and Q analog signals are then input to the base analog filters 10010 and 10017.

Baseband Analog and Digital Filters:

The I and Q signals are amplified and filtered in the blocks 10009 thru 10011 and 10016 thru 10018. In these blocks, there is contained a DC offset compensation function under the control of the DC offset compensation architecture described in FIG. 12 and discussed below. In the 10009 thru 10011 (and 10016 thru 10018), the down converted I and Q signals are filtered and conditioned for input to the sigma delta A/D converters. The analog baseband filters 10010 and 10017 suppress the close in blocking signals and reduce the required dynamic range of the sigma delta A/D converter and thus reduce the required number of bits. The sigma delta A/D converter can get up to 84 dB of SNR or about 14 bits with an OSR of 64 to 128 with a $2^{nd}$ or $3^{rd}$ order loop.

In one embodiment of this invention, the decimating filters, blocks 10013 and 10020 contain multiple digital decimating filters with varying bandwidths as required for each standard being supported. In another embodiment of this invention, the decimating filters are programmable for selected bandwidths as required to support selected standards.

Time Delay Compensation and Alignment of the SOI:

In one embodiment of this invention, the outputs of 10013 and 10020 are input to 10014 and 10021 respectively. 10014 and 10021 provide for a macro level phase shift of the I and Q channel independently by delaying the signal by a whole number of samples. This is used for the macro alignment of the SOI, containing IMP(s), and the IMP estimated signal(s) that are used to cancel the IMP(s). A complementary function is provided for the IMP estimation and cancellation paths in blocks 10028, 10035, 10039, and 10044. The fine tuning of the alignment of the signals is done in blocks 10029, 10036, 10040, and 10045 wherein the samples are delayed by fractions of sample times as shown in FIG. 5. This provides the capability to dynamically adjust for different delays times in different paths over time and temperature. The outputs of the macro delays, 10014 and 10021, for the I and Q channels are input to the summing and IMP cancellation blocks 10042 and 10031 respectively.

In one embodiment of this invention, test tones are inserted into 10007 when the receiver is powered up to provide the macro level adjustment in blocks 10014, 10021, 10028, 10035, 10039 and 10044. After the initial alignment, the macro and micro delays are controlled by the complex correlators 10032, 10038, 10043 and 10047.

Search for IMP Source Signals that can Generate SOI Inband IMPs:

In one embodiment of this invention, the output signal from the VGA 10007 is sent to the flash A/D converter 10022 where in the full passband of the receiver is over sampled at a low resolution, nominally 2 to 6 bits. In this example, 4 bits will be used. In other embodiments of this invention, the resolution can be as low as 1 or 2 bits. As one versed in the arts will see, the techniques and methods in this invention are valid for a range of resolution of bits.

In one embodiment of this invention, the sampling clock, from PLL 10004, is kept coherent with the down conversion mixing processes 10008 and 10015 by generating the sampling clock as a ⅛ or ¼ clock generated from the down conversion mixing reference signal. This will aid in coherently decomposing the IMP estimated cancellation signal into the I and Q components for cancellation in the I and Q signals output from 10014 and 10021.

In one embodiment of this invention, the output of the flash A/D converter 10022 is sent to the search block 10023. As shown in FIG. 2, the receive band (25 MHz for the Cellular band and 60 MHz for the PCS band) is broken up into twenty (20) 3 MHz frequency blocks. A 20 point FFT (or a DFT) is computed with one frequency component for each frequency block. The search algorithm determines which blocks have enough power to be of concern for IMP generation and which have the required frequency spacing such that an IMP generated by them will fall inband of the SOI. When the frequency bands with potential source signals (which can generate SOI inband IMP(s)) have been identified, these frequency bands are broken into ten (10) bands, each 300 kHz wide. For each of the 3 MHz blocks, a ten (10) point FFT (or DFT) is computed, one component for each 300 kHz block. As shown in FIG. 2, the programmable source signal filters (block 10024) are programmed to isolate the source signals. The IMP source signal filters are wideband with respect to the source signals so that a high quality copy of the source signals is obtained in the time domain. The output of the source signals filters (10024) are sent to the blocks 10025 and 10032 where the estimate of the IMP(s) are generated.

In another embodiment of this invention, the entire receive band is searched in one step by computing a 256 point FFT or DFT with frequency resolution of less than 300 kHz. The search algorithm then determines which of the 300 kHz frequency blocks contain sufficient power and the required frequency spacing to generate IMP(s) in the Bandpass of the SOI. As one versed in the art will recognize, the resolution of the FFT (or DFT) can be varied to accommodate different source signals of varying bandwidths. This example in meant for illustrative purposed and is not intended to limit the scope of this invention. As an example when the source signals are GSM or WCDMA signals, the frequency blocks and the source signal filters in 10024 will be wider.

Generation of the Estimate of the Estimate of IMP Cancellation Signal:

In one embodiment of this invention, the search algorithm searches the receiver passband to detect the approximate location of signals that have sufficient power and the correct relative location as required to generate IMP(s) inband of the signal of interest (SOI). Source signal filters are used that are two to three times as wide as the source signals so that high fidelity copies of the source signals are obtained in the time domain. As shown in FIG. 2 and FIG. 3, after the source signals have been isolated, they are multiplied together as required to generate $3^{rd}$ order IM(s). This is done by multiplying one signal times itself times the other signal. The result is then filtered in blocks 10026 and 10033 to isolate only the IMP(s) that will fall inband of the signal of interest. As one versed in the art will recognize, this process can be done simultaneously for any number of sets of source signals in the receiver passband. Only two sets of source signals, generating two IMP(s) are discussed here as an example. This is not intended to limit the scope of the invention.

In one embodiment of this invention, the estimates of the IMP(s) are decomposed into I and Q to be coherent with the down conversion process 10008 and 10015. This is done digitally in blocks 10027 and 10034. Adjustments to the I and Q decomposition are done in blocks 10027 and 10034 to optimize the IMP cancellation process. These control signals are not shown in FIG. 10 to keep the control flows simple.

In one embodiment of this invention, blocks 10028 thru 10032 perform the IMP cancellation process. This process in the same for blocks 10035 thru 10038, 10039 thru 10043 and 10044 thru 10047. As one versed in the art will recognize, this process can be duplicated to process any number of IMP and IMP cancellation signals.

IMP Cancellation and Phase and Amplitude Adjustment of the IMP Cancellation Signals:

In one embodiment of this invention, the estimate of the IMP is delayed by whole sample times in block 10028 under the control of the complex correlator 10032. This is done to get the coarse alignment of the IMP in the SOI and the estimate of the IMP generated in the IMP cancellation process. Delay can also be introduced in the SOI path in blocks 10014 and 10021 as discussed above. Block 10029 provides the micro delay adjustment or phase adjustment and 10030 provides the amplitude adjustment and signal inversion under the in block 10030 prior to being added to the SOI to cancel the IMP. The micro delay compensation is done under the control of the complex correlator 10032. Block 10029 performs the micro phase shift as shown in FIG. 5. The required phase adjustment is achieved by interpolating between two samples and then mapping the new value into the time slot required to produce the desired phase shift. With this method, arbitrarily small phase shifts can be achieved.

In one embodiment of this invention, the inverted estimate of the IMP from block 10030 is sent to the summing and cancellation block 10031 and to the complex correlator 10032. The complex correlator correlates the sampled output of the cancellation cell 10031 with the sample of the estimate of the IMP from 10030. The complex correlator provides phase and amplitude adjustment control signals to the blocks 10028, 10029 and 10030 using a dither or like algorithm to minimize the correlation between the output of 10030 and 10031. When the cross correlation is at a minimum, the optimal cancellation has been achieved. If the IMP cancellation process in accurate to 1 bit, 6 dB of IM suppress will be achieved. If two bits are accurate, 12 dB of IM suppression will be achieved. In different embodiments of this invention, the cancellation process may be done at varying resolutions from 1 to 8 bits depending on the implementation.

The functions of blocks 10028 thru 10031 are functionally duplicated in blocks 10035 thru 10038, blocks 10039 thru 1043 and blocks 10044 thru 10047. Each of these paths provides an independently controllable IMP cancellation process for different IMPs in both the I and Q channels. All IMPs are cancelled in block 10031 and 10042 and the output of the cancellation process goes to multiple cross correlation processors the control the individual processes. The IMPs are uncorrelated and this provides the capability to cancel and cross correlate multiple IMPs simultaneously.

DC Offset Compensation

DC Offset and Associated System Impacts:

In one embodiment of this invention, DC offset compensation is provided to compensate for time varying DC signals in the signal of interest (SOI). As shown in FIG. 11, in direct conversion receivers, the DC offset can be generated by time varying DC offsets in the analog components of the receiver as well as by the mixing of the reference signal, which is at the RF frequency, with any residual carrier in the receive signal or any leakage of the LO into the receive signal. The energy in the residual carrier or the carrier leakage into the receive signal will be down converted to DC and will be a key component of the DC offset in the SOI. Another component of the DC offset can result from self mixing of amplitude modulated high power blocking signals within the receiver passband. This can result in a $2^{nd}$ order IMP that exists at baseband with a high frequency content (out to several hundred kHz). DC offset can also be induced by Doppler shift on the receive signal and this can have frequency content up to several hundred hertz.

The combination of these DC generating mechanisms can cause the saturation of the baseband analog components as well as degrading the SOI. The DC offset can be a time varying signal and the DC offset compensation requires an adaptive process. In systems where the signal is half duplex, the DC offset can be measured when the receive signal is off and the DC offset compensation adjusted. With signals that are continuous, this is not practical. This invention contains a mechanism to continuously measure the DC offset and provide DC offset compensation without taking the receiver off line.

Figure 12:
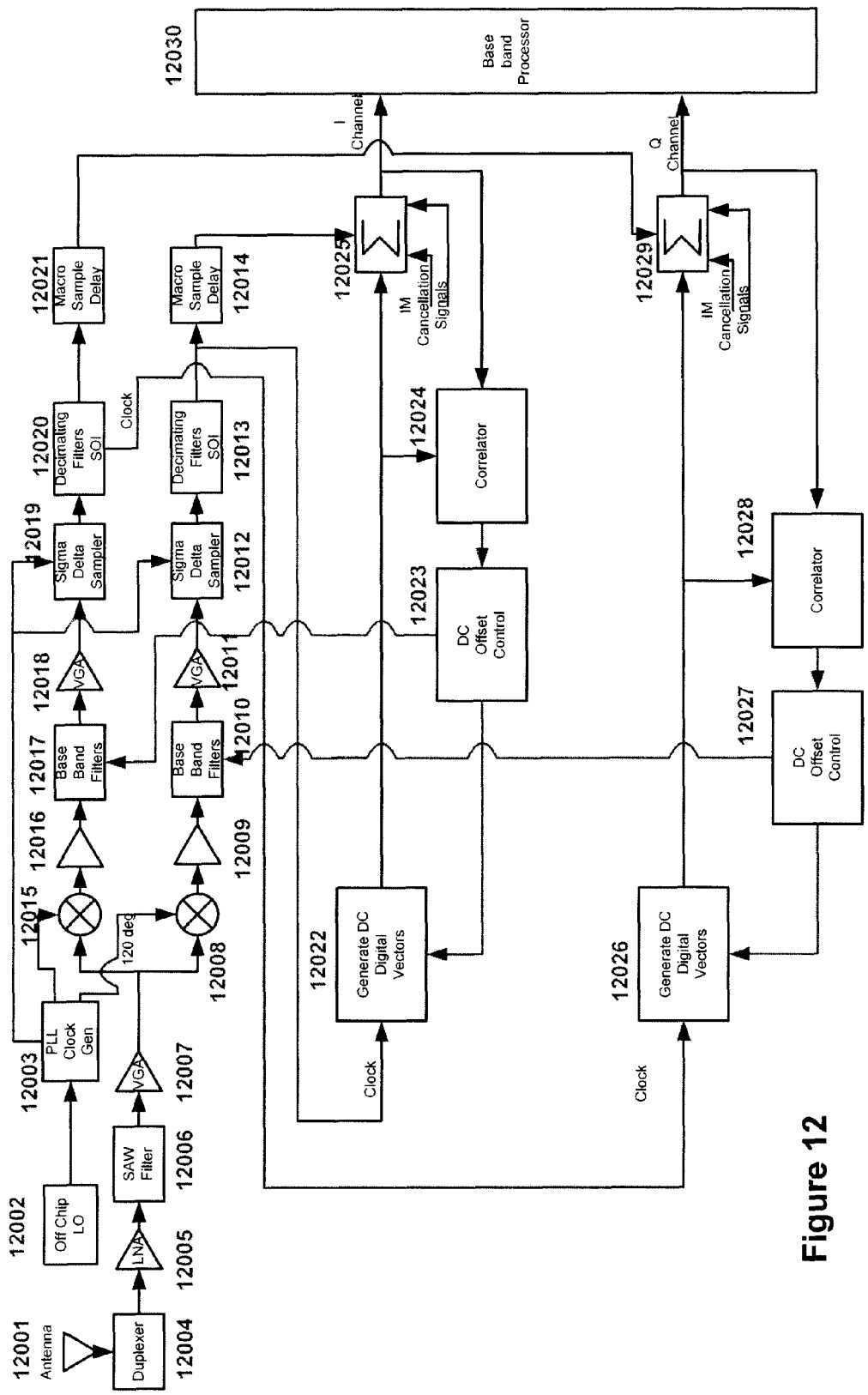
FIG. 12: DC Offset Compensation I and Q Channels

Description of Complex I-Q DC Offset Compensation:

One embodiment of the DC offset Compensation is shown in FIG. 12. In block 12001, the antenna receives the receive band and the signal is filtered in the duplexer 12004 where in the transmit signal feed thru is filtered and out of band signals are rejected. The blocks 12002 thru 12021 perform the same functions as described for FIG. 10 blocks 10002 thru 10021. LO leakage from 12002 and 12003 into the receive signal path can generate a residual carrier in the SOI. This will produce a DC offset term in the signal of interest when the signal is converted to baseband in a direct conversion receiver. Analog components in the receiver from 12004 to 12019 can also contribute to the DC offset. Some of this can be mitigated by using a differential design because most $2^{nd}$ order products are common mode. However, even the differential implementations are never perfect and some DC offset still exists.

In one embodiment of this invention, the baseband analog filters and the baseband VGA (blocks 12017 and 12018) (blocks 12010 and 12011) contain analog DC offset compensation circuitry which is controlled by the DC offset control 12023 and 12027. This invention provides for independent DC offset compensation for each of the I and Q channels of the SOI.

In one embodiment of this invention, the sample clock is recovered from 12020 and 12013. Blocks 12022 and 12026 generate a digital DC signal by generating a set of samples with the same values at the clock rate of the samples of the SOI for each of the I and the Q channels. The amplitudes of these signals are under the control of the I and Q DC offset control blocks 12023 and 12027.

For explanation purposes, the process for blocks 12013, 12014, 12022, 12023, 12024 and 12025 will be described. The same process description applies to blocks 12021, 12026, 12027, 12028, and 12029. In one embodiment of this invention, block 12025 is the same block as 10031 and 12029 is the same block as 10042.

In one embodiment of this invention, the sample clock for the signal of interest is taken samples off of the output of block 12013. This clock is used to generate the DC offset reference signal which will be adjusted in amplitude under the control of block 12023, the DC offset control. The digital DC signal is inverted in 12022 and output to the summing block 12025 where it is used to cancel the DC offset in the SOI. The output of 12025 is sent to the baseband processor 12030 and to the correlator 12024 which has received a copy of the inverted DC reference signal from 12022. The correlator computes the cross correlation between the inverted DC reference signal and the output of the summing block 12025. In one embodiment of this invention, the DC offset is cancelled by an adjustment of the amplitude of the DC reference signal that is generated in 12022.

In one embodiment of this invention, the DC reference signal is sent only to the correlator 12024 and not to the summing block 12025. The non-inverted DC reference signal is cross correlated in the correlator 12024 with output of the block 12025. In one embodiment of this invention, block 12025 is the same block as 10031 in FIG. 10 and 12029 is the same block as 10042 in FIG. 10. In this embodiment of the invention, the DC offset control sends a control signal to blocks 12016, 12017 and 12018 wherein the DC offset control is managed in the analog circuits associated with the baseband analog filters and amplifiers. The description also holds for 12026, 12027, 12028, 12029, 12009, 12010 and 12011.

In one embodiment of this invention, the DC offset mitigation is done with a combination of the digital and analog techniques described above under control of the blocks 12023 and 12027. The DC reference signals from 12022 and 12023 are used for the cross correlation to determine the DC content in the I and Q SOI channels and the DC offset controls, 12023 and 12027, manage the analog and digital DC offset compensation.

In one embodiment of this invention, the update rate of the DC Offset compensation can be varied to control the frequency content in the DC cancellation.

In one embodiment of this invention, (not shown in FIG. 12), the interference caused by $2^{nd}$ order self mixing of high power amplitude modulated blocking signals in the receiver pass band is cancelled. The process is a subset of the $3^{rd}$ order IMP cancellation process in that the blocking signal is squared and it is not then multiplied by another signal to create a $3^{rd}$ order IMP. The second order IMP estimate is low pass filtered and the phase and amplitude adjustment are the same as described for the $3^{rd}$ order IMP cancellation process. In different embodiments of this invention, the DC offset techniques described herein are used individually or in combination with each other.

Figure 13:
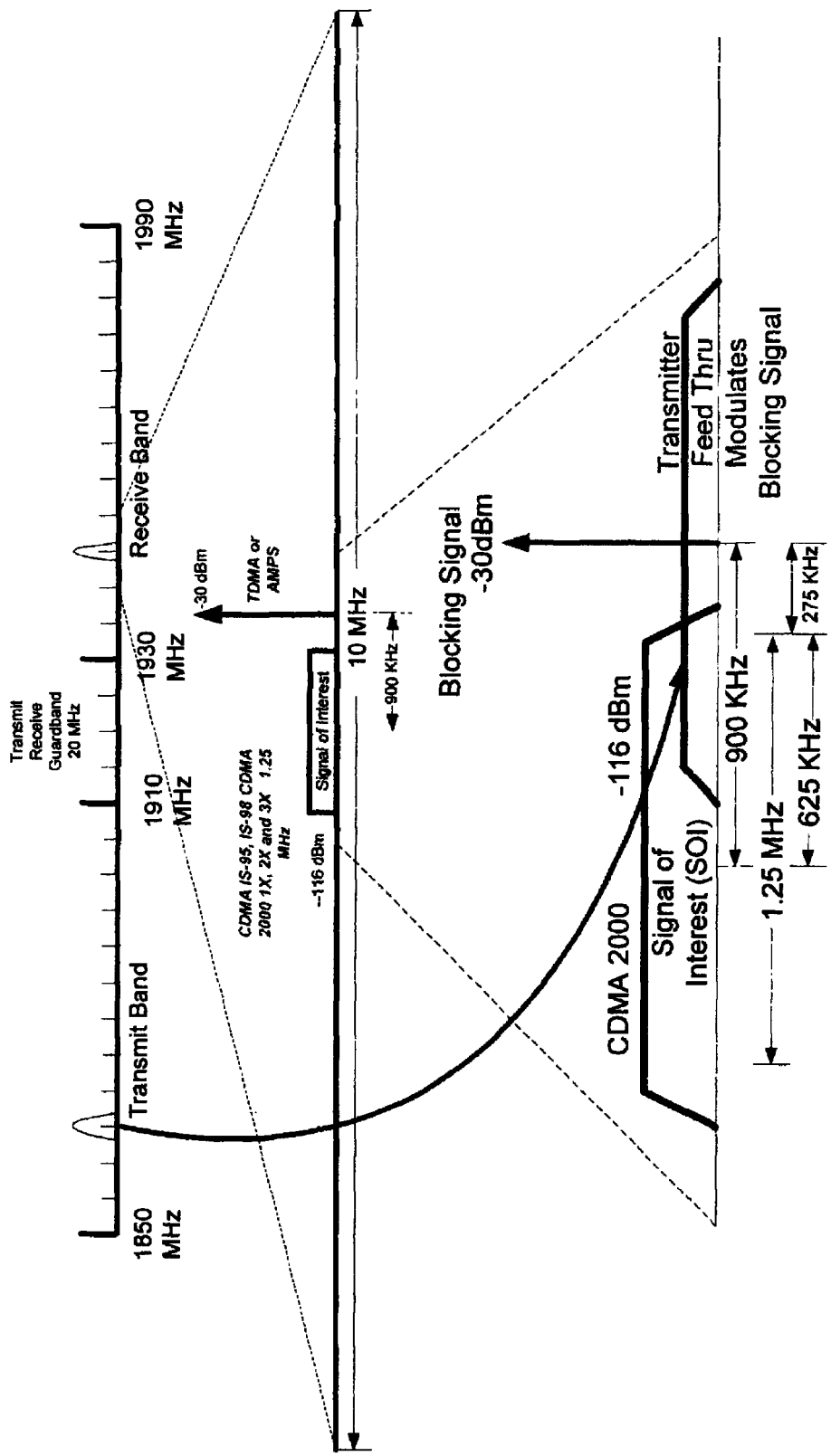
FIG. 13: Transmitter Feed Thru and Cross Modulation Mechanism

Transmitter Feed Thru Cross Modulation Interference Cancellation Cross Modulation, the Cause and the Problem The receiver performance, in full duplex radio transceivers, can suffer from transmitter feed thru. With the example of CDMA2000 telephony, as shown in FIG. 13, the transmit signal can be as high as 30 dBm. The Duplexer 14002 can provide 50 to 55 dB of transmitter suppression, but this can still leave the transmit signal at −20 dBm, which can cause compression in the LNA when high power blocking signals are present. The result, as shown in FIG. 13 can result in the blocking signal being amplitude modulated by the transmitter feed thru signal. The blocking signal can be close enough to the receive signal that the blocking signal, modulated by the transmitter feed thru, can overlap into the receive band of the signal of interest and degrade the receiver performance. The cross modulation is realized when amplitude modulated signals are amplified and the $3^{rd}$ order mixing results in the cross modulation. This is described in detail in a the IEEE Journal of Solid State Circuits Vol 7 No. 1 1972 by Robert G. Myer, Mark J. Shensa and Ralph Eschenbach.

In one embodiment of this invention, with the mathematics of the cross modulation known and with real time samples of the transmitter feed thru and the other mixing signals, an estimate of the cross modulation interference is created and used to cancel the interference in the band of the SOI. The phase and amplitude are adjusted in the same manner as was done for the $3^{rd}$ order IMP interference described in the patent application. This is covered briefly below.

Figure 14:
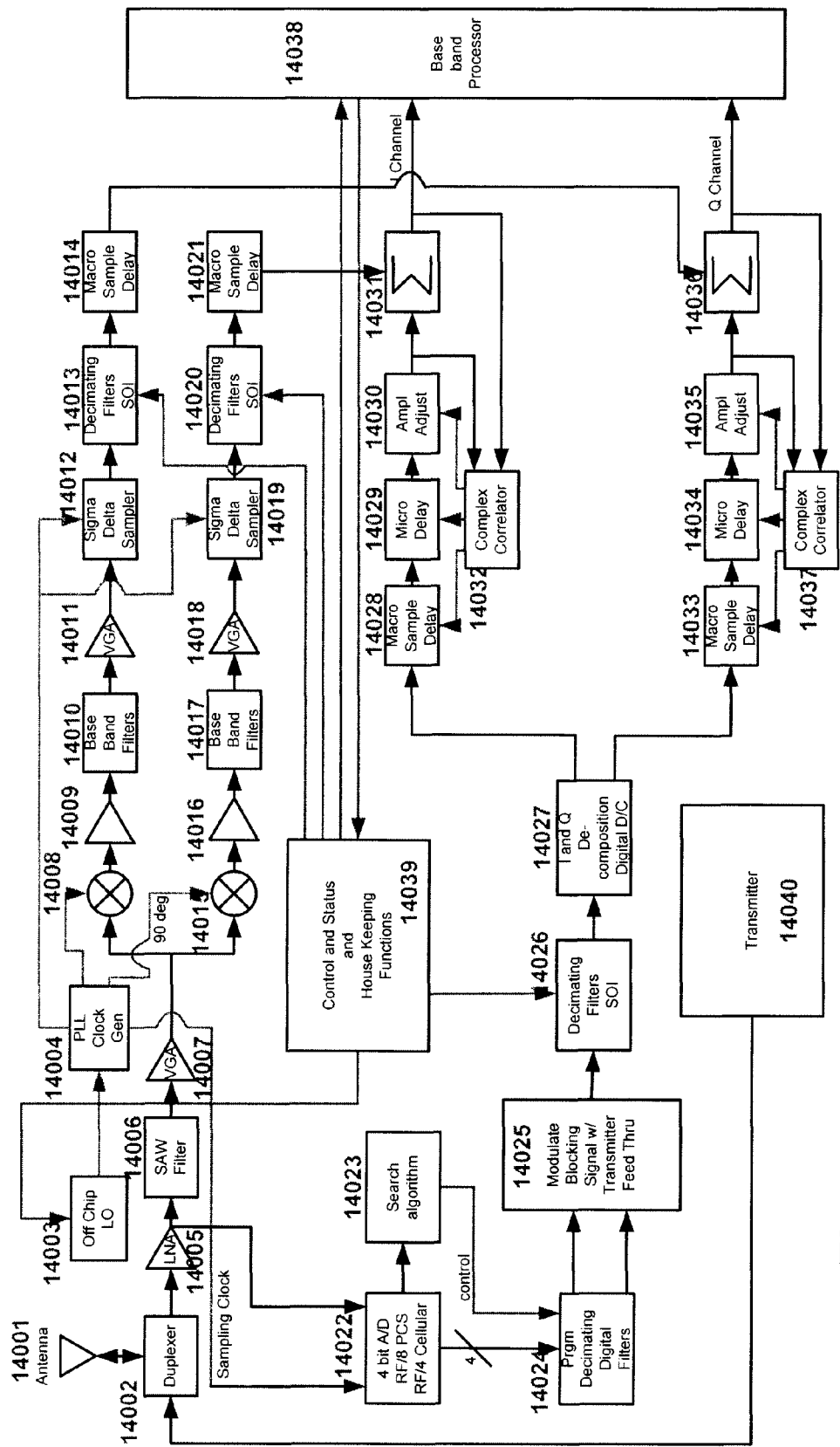
FIG. 14: Transmitter Feed Thru Compensation

Cross Modulation Interference Cancellation Description:

In one embodiment of this invention, as shown in FIG. 14, the transmit signal is filtered in the duplexer 14002 which will suppress the transmit feed thru by 50 to 55 dB. The resulting transmitter feed thru signal will still be around −20 dBm and can amplitude modulate a close-in blocking signal and produce interference in band of the SOI as shown in FIG. 13. This will primarily be experienced in the LNA 14005 prior to the SAW filter 14006. In one embodiment of this invention, the signal for the flash A/D converter 14022 is taken at the output of the LNA prior to the SAW filter. The SAW filter will suppress the transmitter feed thru by another 30 to 40 dB and the transmitter feed thru will not be a problem after that. The sampling clock is kept coherent with the down conversion reference signal that is generated by the PLL 14004. This will aid in the coherent decomposition of the cancellation signal into the I and Q components so that they are kept coherent with the I and Q SOI channels at the output of 14014 and 14021.

In one embodiment of this invention, the band width to be sampled with the flash A/D converter is 140 MHz since it must contain the entire transmit and receiver bands In one embodiment of this invention, the search algorithm need only search for high power signals that are within the bandwidth of the transmitter signal from the SOI. If the blocking signals are beyond that point, the cross modulation products will not fall inband of the signal of interest. This can be done as a subset of the search shown in FIGS. 2, 10 and 12. The location of the transmitter feed thru is a known frequency.

In one embodiment of this invention, the transmitter feed thru and the close in blocking signal are isolated in the decimating filters 14024. The signals are sent to Block 14025 wherein the estimate of the cross modulation interference is generated. The output of 14025 is filtered in block 14026 to reject any energy from the cross modulation that does not fall within the pass band of the SOI.

In one embodiment of this invention, the estimate of the cross modulation interference in decomposed into the I and Q channels in block 14027. After this point, the processing of the cross modulation interference cancellation is performed in the same way as was described for the $3^{rd}$ order IMP cancellation.

Figure 15:
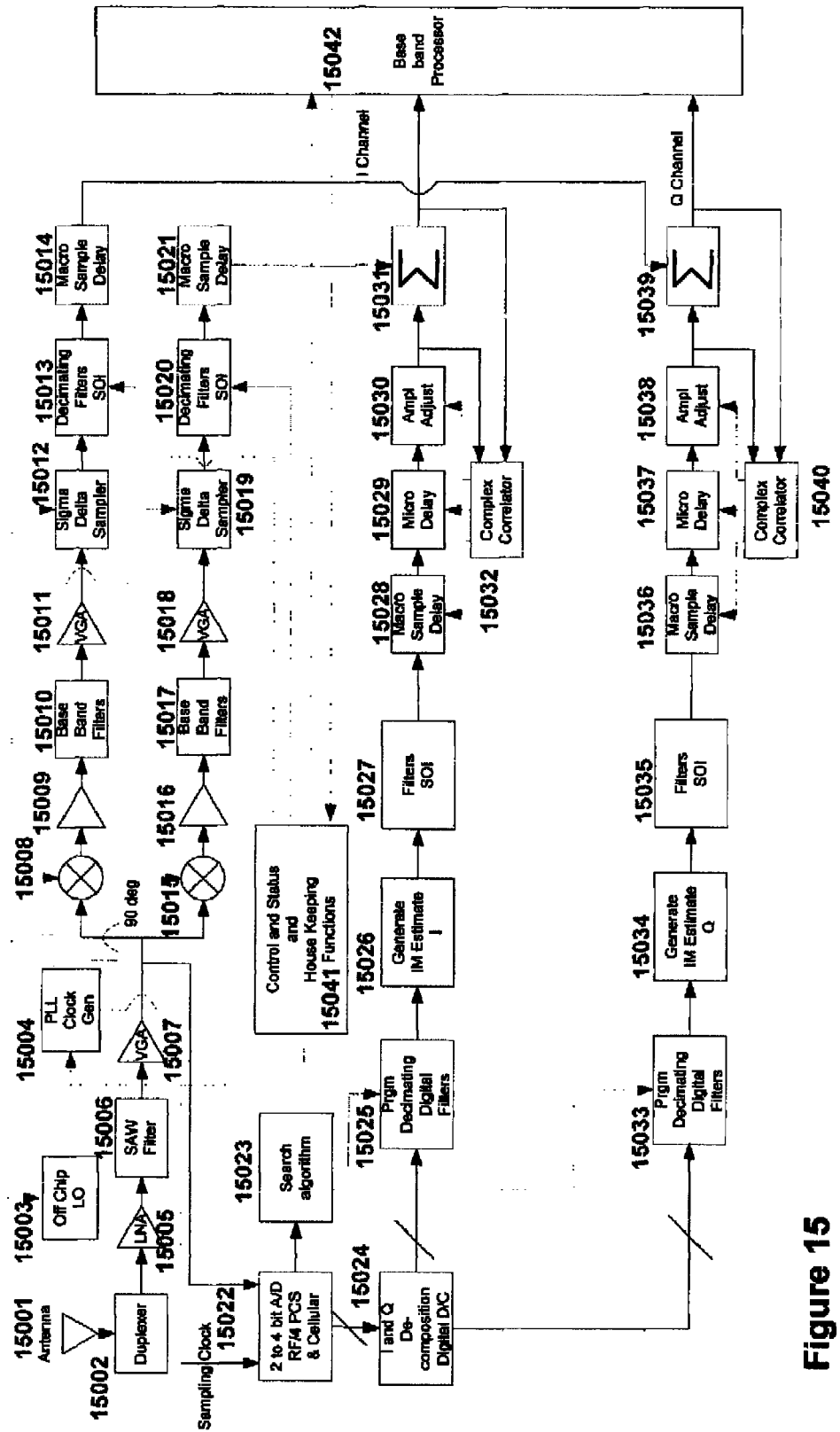
FIG. 15: Direct Conversion Single Inter-mod With I and Q Channel Cancellation with IF or RF Intermod Search and Baseband IMP Cancellation

In another embodiment of this invention, the I-Q decomposition of the transmitter feed thru and the blocking signal are done after the flash A/D as discussed below in FIG. 15 block 15024. The I and Q cross modulation cancellation is then done as described below for $3^{rd}$ order IMPs as shown in FIG. 15.

In one embodiment of this invention, the copy of the transmitter feed thru signal is received from the transmitter after the high power amplifier (HPA) and the close in blocking signal is acquired from the normal IMP source signal acquisition as described in this patent application.

In one embodiment of this invention the transmitter and the receiver are placed together on the same chip and the transmitter feed thru on chip is handled by the technique described above.

In one embodiment of this invention, the transmitter feed thru from the duplexer and the transmitter feed thru from the on chip leakage are managed as two separate interference signals if the phase relationship is not close. The frequency offset due to LO drift might also make the frequency a little different. In another embodiment of the invention, both transmitter feed thru signals are handled simultaneously.

IF or RF Intermod Search and I-Q Decomposition and Baseband IMP Cancellation:

In one embodiment of this invention, the IF or RF passband is sampled at 4 to 8 times the Nyquist rate and this is done coherently with the Direct or dual down conversion path which is done in parallel as shown in FIG. 15. FIG. 15 depicts a single IMP being cancelled in the I and Q channel. This architecture is readily expanded as shown in FIG. 10 to accommodate the cancellation of multiple IMPs simultaneously. In FIG. 15, blocks 15001 thru 15021 perform the same function as the corresponding blocks in FIG. 10 (10001 thru 10021. In FIG. 15, the passband is sampled at 4 to 8 times the Nyquist rate and the sampling clock is kept coherent with the down conversion LO. For the examples of the PCS band and the Cellular band in North America, the sampling clock is the down conversion LO divided by 4. As one versed in the arts will recognize, the exact ratio of the LO to sampling clock is an implementation detail and does not detract from the general application of the invention. For the purpose of explanation, the Cellular and PCS bands will be used herein. It is not the intention of this explanation to limit the scope of this invention.

In one embodiment of this invention, the signal is taken off after the SAW filter 15006 or the VGA 15007. The A/D converter samples the passband with a resolution of 2 to 4 bits depending on the SNR of the search algorithm. The selection of the number of bits is an implementation detail. In one embodiment of this invention, 2 bits are used and in others 3 to 6 bits are used. For this explanation, 2 bits will be used. As one versed in the art will recognize, the selection of the number of bits is a design implementation detail and does not detract from the general application of this invention.

In another embodiment of this invention, the signal at the output of 15007 is down converted to a low IF (coherent with the direct conversion path 15007 thru 15021. The lower IF provides for a greater SNR on the sampled signal and thus, the a greater effective number of bits. The down conversion to IF is done coherently as well as the sampling at IF. That is, it is kept coherent with the direct down conversion 15007 thru 150021.

In one embodiment of this invention, the A/D converter 15022 samples the receiver passband after the SAW filter which acts like an anti-aliasing filter. The over sampling of the passband is at 2 to 4 times the Nyquist Rate. At the output of the A/D, the digital samples are sent to the search algorithm 15023 and the I-Q decomposition block 15024. The decomposition is performed by taking sample sets of four samples and taking the 1st and the $2^{nd}$ to get I and Q and dropping the $3^{rd}$ and the $4^{th}$. In another embodiment of this invention, the $1^{st}$ and the $3^{rd}$ are averaged and the $2^{nd}$ and the $4^{th}$ are averaged to improve the SNR by up to 3 dB.

In one embodiment of this invention, the I and the Q channels may be reversed and the block 15024 determines which channel is I and which is Q so as to align the correct cancellation IMP with the correct channels at the output of 15014 and 15021. The control for this is not shown in the figure, but it is done with the information available from the cancellation and correlation paths.

At this point, the functions performed in 15025 thru 15032 and 15033 thru 15040 are the same as described above in this patent application, only here they are done on the I and Q channel independently. These blocks adjust the phase and amplitude of the IMP estimate, invert the estimate and use it to cancel the SOI inband IMP.

Figure 16:
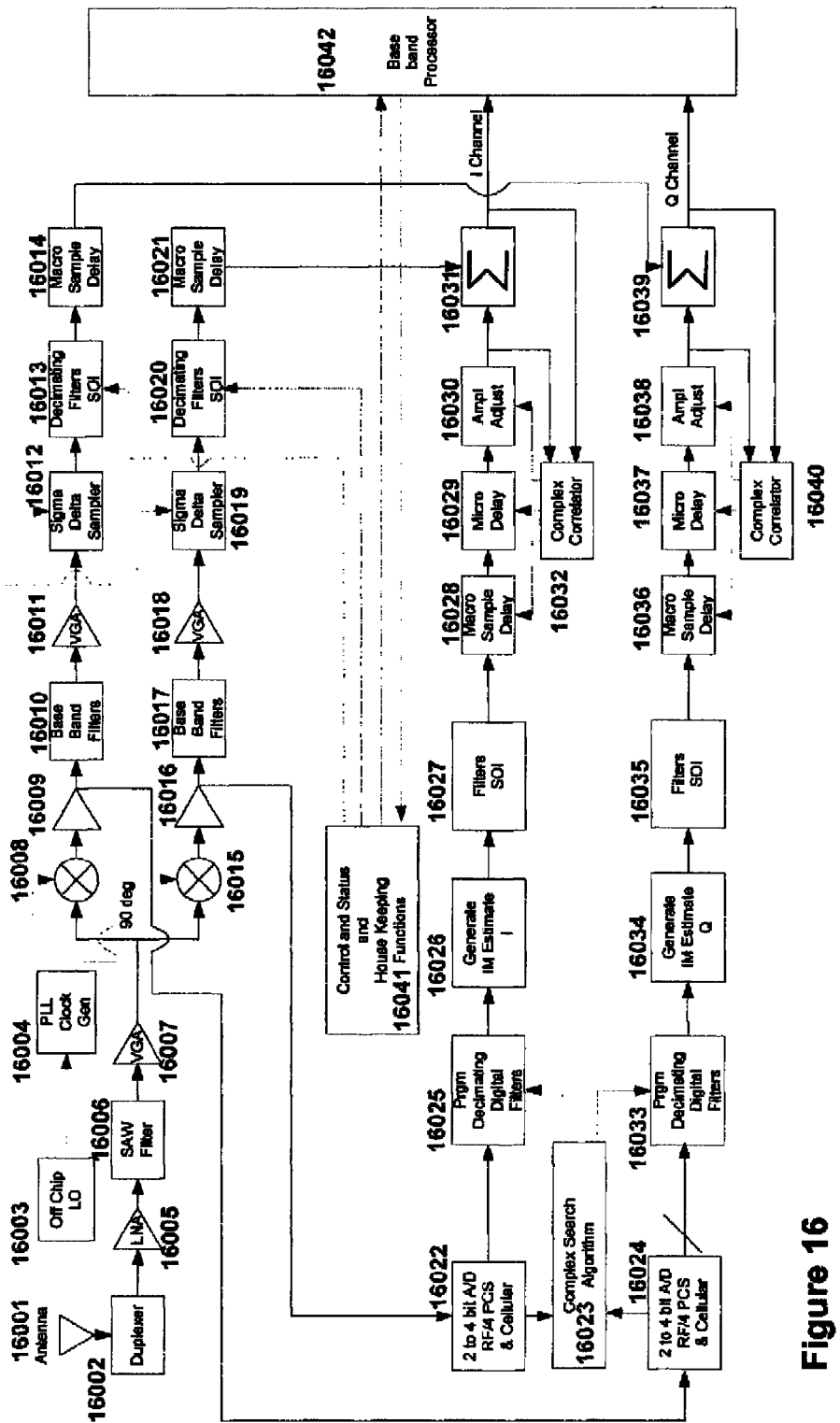
FIG. 16: Direct Conversion Single Inter-Mode with I and Q Channel Cancellation with Baseband Inter-mod Search and IMP Cancellation

Baseband Intermod Search and I-Q Decomposition and Baseband IMP Cancellation:

In one embodiment of this invention, the signals are sampled at the output of the down conversion process prior to low pass filtering on the I and the Q channels. This is shown in FIG. 16, at the output of blocks 16009 and 16016 prior to the analog low pass filters 16010 and 16017. The purpose of the analog low pass filters is to limit the energy in the SOI path after prior to the sigma delta A/D converters. The source signals that are required to get the estimate of the SOI inband IMP will be significantly filtered and might not be available. The full I and Q channels are sampled prior to analog filtering and input to blocks 16022 and 16024. No additional I-Q decomposition is required because the I and Q channels are already been separated and each is being processed separately. The outputs of the two A/D converters, at 2 to 6 bits, are sent to the complex search algorithm 16023. The complex search algorithm will compute a complex FFT or DFT with a frequency resolution of 300 KHz to 4 MHz depending on the bandwidth of the source signals anticipated. With a 2 bit A/D converter with a sampling rate of 150 MHz, the effective number of bits after the decimating filters 16025 and 16033 will be 4 bits at the input to blocks 16026 and 16034. The number of bits of quantization and the FFT and DFT resolution are implementation design details and are application dependent. As one versed in the art will recognize, the selection of these parameters does not detract from the general application of the invention.

If the IMP cancellation is accurate to 3 bits, 18 dB suppression of the IMP will be realized and if the process is accurate to 4 bits, the suppression will be 24 dB. In different embodiments of this invention, a higher number of bits are used in the A/D converters and the subsequent processing if greater suppression of the IMPs is required. As will be recognized by one versed in the arts, the resolution, (the number of bits) is an implementation detail and does not detract from the general application of the invention.

In one embodiment of this invention, the complex search algorithm uses complex filtering techniques to resolve IMP source signal in the I and Q channels. The output of the Complex Search Algorithm block 16023 sends control signals to the blocks 16025 and 16033 where in the IMP source signals are isolated with programmable band pass filters and the results are send to the Generate IMP Estimate blocks 16026 and 16034 where the IMP source signals are multiplied together to create estimates of the SOI inband IMPs. The IMPs are then filtered in 16027 and 16035 to reject any IMP frequency components that do not fall within the SOI band pass. The functions performed in blocks 16028 thru 16032 and 16036 thru 16040 are the same as described above for the phase and amplitude alignment of the IMP estimate with the SOI inband IMP.

In one embodiment of this invention, $2^{nd}$ order IMPs are handled as a subset of the $3^{rd}$ order IMP process.

Figure 17:
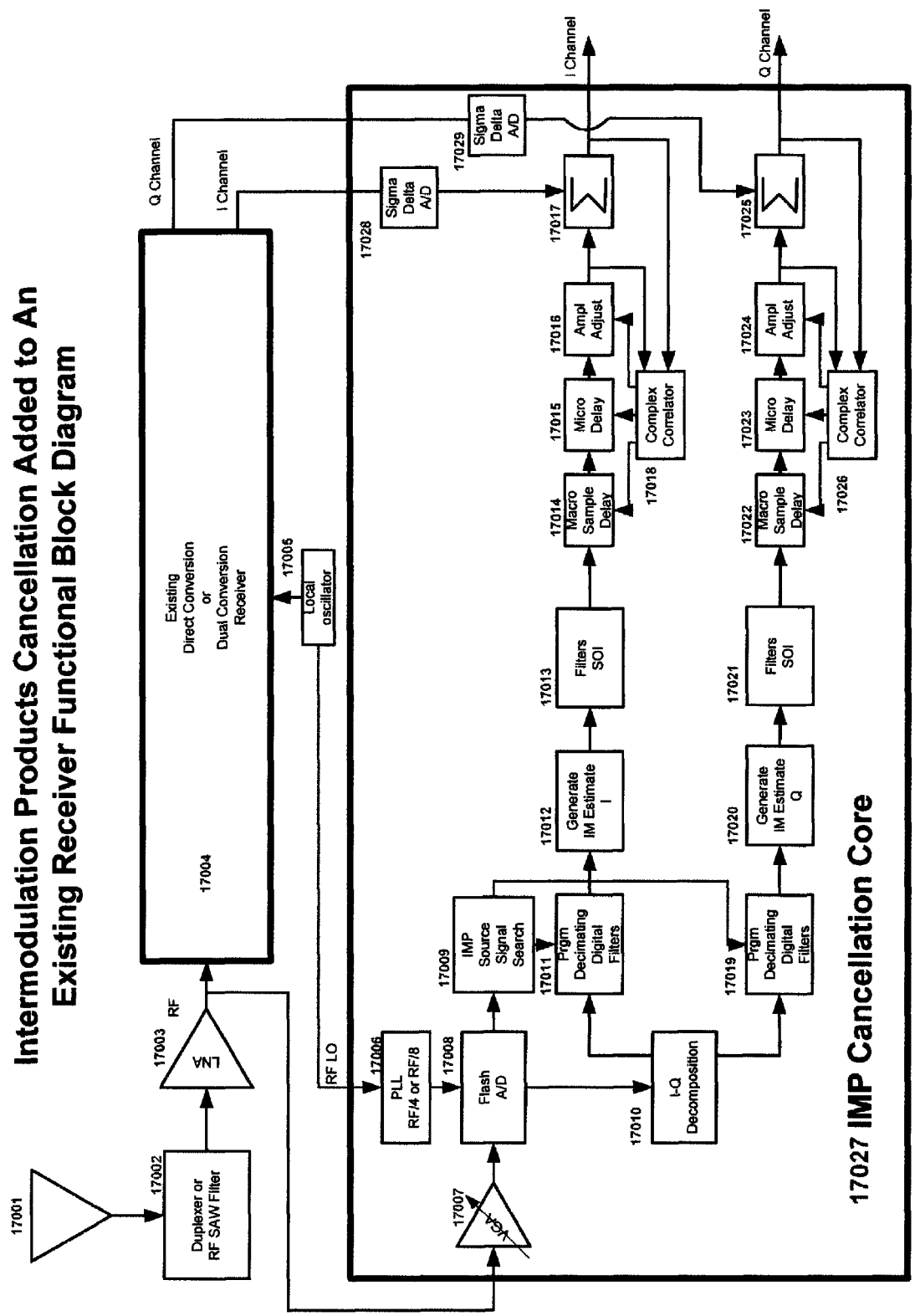
FIG. 17: Inter-Mod Cancellation as an Add-on Architecture to an Existing Direct or Dual Conversion Radio

IMP Cancellation as an Add on to an Existing Receiver:

In one embodiment of this invention, shown in FIG. 17, the IMP cancellation core is added to an existing radio receiver 17004. The existing receiver can be either a super heterodyne receiver or a direct conversion receiver. The output of the existing receiver is a complex signal set with I and Q or a single channel if the SOI is not a complex real signal with an I and a Q channel (such as an FM signal). In the case of a signal which is not a complex real signal, either the I or the Q channel is used.

In one embodiment of this invention, the SOI is received at the antenna 17001 and filtered in 17002 by either a duplexer (for full duplex systems) or a SAW filter (for simplex systems) to filter out signal beyond the receive band. The SOI channel is a channel within the receive band which is assigned as the user moves from cell to cell. The receive channel is then amplified in the LNA 17003. The LNA amplifies the entire receive channel. IMPs are generated as a function of the nonlinear characteristics of the analog components in the block 17001, 17002, 17003 and 17004. When the system is a half duplex system like GSM, the SAW filter is place before the LNA because the system does not have the filtering advantage of the duplexer. In this case, high power blocking signals in the pass band of the receiver can self mix and product a low frequency (near DC) $2^{nd}$ order IMP. $3^{rd}$ order IMPs are also created by the mixing of two signals.

In one embodiment of this invention, the analog RF signal is split after the LNA 17003 and one signal goes to the Existing Receiver 17004 and the other goes to the IMP Cancellation Core 17027 and is input to the variable gain amplifier (VGA) 17007. In another embodiment of this invention, 17007 may be an LNA.

In one embodiment of this invention, the A/D converter 17008 samples the output of the VGA with a sampling clock that is coherent with the down conversion LO used by the existing receiver. This is done to keep the IMP cancellation process coherent with the down conversion in the Existing Receiver. The down conversion is the IMP Cancellation core is done digitally and keeping the sampling clock coherent with the down conversion LO provides the capability to keep the two processes coherent and this keeps the IMP cancellation signal and the IMPs generated by the blocks 17001 thru 17004 at the same frequency as the digitally down converted signals in 17027. The phase and amplitude adjustments are made in the IMP Cancellation Core.

In one embodiment of this invention, the signal received after the LNA at the VGA input 17007, contains the full pass band of the receiver and all extraneous signals that are present in the LNA that can cause IMPs. The flash A/D samples the signal from 17007 at 4 times the Nyquist rate at a low bit resolution from 2 to 4 bits. In the case of the PCS band, this may be at the LO divided by 4.

In one embodiment of this invention, the output of 17007 is coherently down converted to a lower IF to achieve a higher SNR on the sampled signals in 17008 and more bits of quantization may be used. For this example of the invention, a 4 bit A/D will be used. In other embodiments of this invention, 2 to 6 bits are used. The number of bits used is an implementation design detail and is a function of the signal environment and the resolution required and the number of bits of cancellation desired. As one versed in the art will recognize, the selection of the number of bits does not detract from the general application of the invention. The examples presented here are for explanation of the invention and are not intended to limit the scope of the invention.

The samples from the A/D converter 17008 are sent to 17009 IMP Source Signal Search and to 17010, I-Q Decomposition. The search algorithm (as shown in FIG. 2) described above in this invention, finds the location of signals that can mix to cause $2^{nd}$ or $3^{rd}$ order IMPs in the pass band of the SOI. The block 17009 sends control signals to the Programmable Decimating Bandpass filters 17011 and 17019 where the IMP source signals are isolated and the number of bits is increases as the band width of the signal is reduced from 60 MHz to less than 1 MHz or 4 MHz for WCDMA IMP source signals.

In one embodiment of this invention, the output of the A/D converter 17008 to 17010 is a real time signal. The samples are decomposed by taking sets of 4 samples and feeding the $1^{st}$ sample to one channel and the $2^{nd}$ to the other channel and dropping the $3^{rd}$ and the $4^{th}$ samples. In one embodiment of this invention, the $1^{st}$ and the $3^{rd}$ samples are averaged and the $2^{nd}$ and the $4^{th}$ are averaged to get the two I and Q channels. The block 17010 has the capability to reverse the I and Q channels if the original alignment is not correct. This is determined in the cancellation process and control signals are sent back to 17010. (this is not shown in the block diagram).

Blocks 17011 thru 17026 perform the same functions as described for 15026 thru 15040. The difference in this embodiment of the invention is that the SOI channels I and Q are received from the existing receiver. In one embodiment of this invention, the I and Q signals are digital signals and in another embodiment of this invention, the I and Q signals from the existing receiver are analog. When the I and Q signals are analog, a sigma delta A/D converters 17028 and 17029 are placed on the I and Q channels within the IMP cancellation core 17027 prior to the input to blocks 17017 and 17025. When the I and Q signals from the existing receiver are digital, blocks 17028 and 17029 are eliminated.

In one embodiment of this invention, the DC offset compensation described in FIG. 12 in included in the IMP Cancellation Core shown in FIG. 17. The DC offset compensation is not included in the block diagram in FIG. 17 to reduce congestion.

What is claimed is:

1. A method comprising:
    over sampling of the entire receiver passband to acquire the Intermodulation Product (IMP) source signals that can generate IMPs within the Signal of Interest (SOI), using these signals to generate a coherent complex I-Q channel estimates of the interference and, after phase and amplitude adjustment, using these estimates to cancel the SOI inband IMPs in the I and Q channels independently and simultaneously in near real time;
    generating estimates of $2^{nd}$ and $3^{rd}$ order IMP products, adjusting the phase and amplitude of the estimates and using the estimates to cancel the SOI inband IMPs on the I ad Q channels independently and simultaneously in real time or very near real time;
    sampling of the transmitter feed thru signal and blocking signals and computing the cross modulation products estimate and adjusting the phase and amplitude and using the estimate to cancel the SOI inband cross modulation products energy in real time or near real time in the I and Q channels of the receiver;
    using the cross modulation cancellation to cancel of the effects of the on chip transmitter feed thru to support building a single transceiver chip with full duplex operation with cancellation being done independently and simultaneously on the I and Q channels of the receiver;
    creation of an estimate of the DC offset in the receiver and adjusting the amplitude of the DC offset in a near real time closed loop fashion to cancel the DC offset in the I and Q channels independently and simultaneously and adjusting the rate of update to match system parameters.

2. The method in claim 1 wherein a fast search algorithm is done on the over sampled passband at IF or RF and a two stage DFT or FFT search is conducted to find the source signals and the over sampled receiver passband is decomposed into I and Q components coherent with the SOI down conversion and the IMP cancellation is performed on the I and Q channels independently and in real time.

3. The method in claim 1 wherein the over sampled receiver pass band is filtered with digital filters on the I and Q channels to isolate the IMP Source signals and increase the effective number of bits as a function of the over sampling ratio OSR.

4. The method in claim 1 where the I and Q channels are over sampled after the down conversion, but prior to low pass or band pass filtering, and each I and Q channel is sampled with and A/D converter and is searched to find the IMP source signals and these signals are used to generate the IMP estimates which are used to cancel the inband IMPs in the I and Q Channels simultaneously and independently.

5. The method in claim 1 wherein the IMP source signals are digitally multiplied together sample by sample to create the $2^{nd}$ or $3^{rd}$ order IMP cancellation signal in the I and Q channels simultaneously and independently.

6. The method in claim 1 wherein the IMP estimate is adjusted in phase and amplitude until the complex cross correlation between the IMP estimate, used to cancel the SOI inband IMP, and the SOI after IMP cancellation is forced to a local minimum and this is done for the I and Q channels simultaneously and independently.

7. The method in claim 1 wherein the cancellation signals are eliminated when the source signals which create the IMPs are no longer present and this is done on the I and Q channels simultaneously and independently.

8. The method in claim 1 wherein the phase of the IMP estimate is adjusted on a sub-sample basis and this is done on the I and Q channels simultaneously and independently by means of interpolating between to samples and then mapping the new value into the time slot of one of the original samples to create an advancement or retarding of the phase in time.

9. The method in claim 1 wherein the IMP source signals and the IMP cancellation process cancels IMP signals generated from both tones and modulated signals and combinations of each from anywhere within the receiver pass band, and this is done for one or more IMPs and is done simultaneously and independently for the I and Q channels.

10. The method in claim 1 which is applicable to multiple modulations, signal bandwidths and standards to include, but not limited to: Wireless Telephony CDMA2000, GSM, EDGE, TDMA IS-136, GPRS, 3G WCDMA, GPS, 802.11a/b/g and Bluetooth.

11. The method in claim 1 which is applicable to satellite communications.

12. The method in claim 1 which is applicable to terrestrial fixed wireless communications to include, but not be limited to LMDS, MMDS and terrestrial microwave systems.

13. The method in claim 1 which is applicable to wired systems such as cable service and DSL etc.

14. The method in claim 1 wherein the IMP digital sampling and IMP cancellation process are kept coherent with the SOI processing path by clocking the A/D converter with a clock that is coherent with the SOI down conversion LO.

15. The method in claim 1 wherein the phase shift of the IMP cancellation signal or the SOI is done on a sample by sample basis for rough adjustment of the phase offset and then the fine adjustment is done with sub-sample phase shifting and this is continually updated and is done simultaneously and independently on the I and Q channels.

16. The method in claim 1 wherein the full receiver is integrated with the IMP cancellation.

17. The method in claim 1 wherein the IMP cancellation core technology is implemented as an add-on to an existing receiver.

18. The method in claim 1 wherein the DC offset is cancelled for the following sources of DC offset and this is done for the I and Q channels simultaneously: LO leakage, analog components time vary DC offset, Doppler shift, self mixing of high power amplitude modulated blocking signals.

19. The method in claim 1 wherein a fast search algorithm is done on the over sampled passband at IF or RF and a one stage DFT or FFT search is conducted to find the source signals and the over sampled receiver passband is decomposed into I and Q components coherent with the SOI down conversion and the IMP cancellation is performed on the I and Q channels independently and in real time.

20. The method in claim 1 where in the IMP cancellation process is independent of the RF frequency of the signal of interest received at the antenna.

21. An apparatus comprising:
    over sampling of the entire receiver passband to acquire the IMP source signals that can generate IMPs within the SOI, using these signals to generate a coherent complex I-Q channel estimates of the interference and, after phase and amplitude adjustment, using these estimates to cancel the SOI inband IMPs in the I and Q channels independently and simultaneously in near real time;

generating estimates of $2^{nd}$ and $3^{rd}$ order IMP products, adjusting the phase and amplitude of the estimates and using the estimates to cancel the SOI inband IMPs on the I ad Q channels independently and simultaneously in real time or very near real time;

sampling of the transmitter feed thru signal and blocking signals and computing the cross modulation products estimate and adjusting the phase and amplitude and using the estimate to cancel the SOI inband cross modulation products energy in real time or near real time in the I and Q channels of the receiver;

using the cross modulation cancellation to cancel of the effects of the on chip transmitter feed thru to support building a single transceiver chip with full duplex operation with cancellation being done independently and simultaneously on the I and Q channels of the receiver;

creation of an estimate of the DC offset in the receiver and adjusting the amplitude of the DC offset in a near real time closed loop fashion to cancel the DC offset in the I and Q channels independently and simultaneously and adjusting the rate of update to match system parameters.

22. The apparatus in claim 21 wherein a fast search algorithm is done on the over sampled passband at IF or RF and a two stage DFT or FFT search is conducted to find the source signals and the over sampled receiver passband is decomposed into I and Q components coherent with the SOI down conversion and the IMP cancellation is performed on the I and Q channels independently and in real time.

23. The apparatus in claim 21 wherein the over sampled receiver pass band is filtered with digital filters on the I and Q channels to isolate the IMP Source signals and increase the effective number of bits as a function of the over sampling ratio OSR.

24. The apparatus in claim 21 where the I and Q channels are over sampled after the down conversion, but prior to low pass or band pass filtering, and each I and Q channel is sampled with and A/D converter and is searched to find the IMP source signals and these signals are used to generate the IMP estimates which are used to cancel the inband IMPs in the I and Q Channels simultaneously and independently.

25. The apparatus in claim 21 wherein the IMP source signals are digitally multiplied together sample by sample to create the $2^{nd}$ or $3^{rd}$ order IMP cancellation signal in the I and Q channels simultaneously and independently.

26. The apparatus in claim 21 wherein the IMP estimate is adjusted in phase and amplitude until the complex cross correlation between the IMP estimate, used to cancel the SOI inband IMP, and the SOI after IMP cancellation is forced to a local minimum and this is done for the I and Q channels simultaneously and independently.

27. The apparatus in claim 21 wherein the cancellation signals are eliminated when the source signals which create the IMPs are no longer present and this is done on the I and Q channels simultaneously and independently.

28. The apparatus in claim 21 wherein the phase of the IMP estimate is adjusted on a sub-sample basis and this is done on the I and Q channels simultaneously and independently by means of interpolating between to samples and then mapping the new value into the time slot of one of the original samples to create an advancement or retarding of the phase in time.

29. The apparatus in claim 21 wherein the IMP source signals and the IMP cancellation process cancels IMP signals generated from both tones and modulated signals and combinations of each from anywhere within the receiver pass band, and this is done for one or more IMPs and is done simultaneously and independently for the I and Q channels.

30. The apparatus in claim 21 which is applicable to multiple modulations, signal bandwidths and standards to include, but not limited to: Wireless Telephony CDMA2000, GSM, EDGE, TDMA IS-136, GPRS, 3G WCDMA, GPS, 802.11a/b/g and Bluetooth.

31. The apparatus in claim 21 which is applicable to satellite communications.

32. The apparatus in claim 21 which is applicable to terrestrial fixed wireless communications to include, but not be limited to LMDS, MMDS and terrestrial microwave systems.

33. The apparatus in claim 21 which is applicable to wired systems such as cable service and DSL etc.

34. The apparatus in claim 21 wherein the IMP digital sampling and IMP cancellation process are kept coherent with the SOI processing path by clocking the A/D converter with a clock that is coherent with the SOI down conversion LO.

35. The apparatus in claim 21 wherein the phase shift of the IMP cancellation signal or the SOI is done on a sample by sample basis for rough adjustment of the phase offset and then the fine adjustment is done with sub-sample phase shifting and this is continually updated and is done simultaneously and independently on the I and Q channels.

36. The apparatus in claim 21 wherein the full receiver is integrated with the IMP cancellation.

37. The apparatus in claim 21 wherein the IMP cancellation core technology is implemented as an add-on to an existing receiver.

38. The apparatus in claim 21 wherein the DC offset is cancelled for the following sources of DC offset and this is done for the I and Q channels simultaneously: LO leakage, analog components time vary DC offset, Doppler shift, self mixing of high power amplitude modulated blocking signals.

39. The apparatus in claim 21 wherein a fast search algorithm is done on the over sampled passband at IF or RF and a one stage DFT or FFT search is conducted to find the source signals and the over sampled receiver passband is decomposed into I and Q components coherent with the SOI down conversion and the IMP cancellation is performed on the I and Q channels independently and in real time.

40. The apparatus in claim 21 where in the IMP cancellation process is independent of the RF frequency of the signal of interest received at the antenna.

* * * * *